US006898621B2

(12) United States Patent
Kuriki et al.

(10) Patent No.: US 6,898,621 B2
(45) Date of Patent: May 24, 2005

(54) MESSAGE PROCESSING DEVICE MESSAGE MANAGEMENT METHOD AND STORAGE MEDIUM FOR STORING MESSAGE MANAGEMENT PROGRAM

(75) Inventors: Minoru Kuriki, Kanagawa (JP); Kiyoto Naganuma, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/189,410

(22) Filed: Nov. 10, 1998

(65) Prior Publication Data
US 2002/0112006 A1 Aug. 15, 2002

(30) Foreign Application Priority Data
Apr. 24, 1998 (JP) .......................................... 10-115651

(51) Int. Cl.[7] .............................. G06F 15/16; G09G 5/00
(52) U.S. Cl. ...................................... 709/206; 715/971
(58) Field of Search ................................ 709/201, 203, 709/206, 204; 379/93.24, 100.05, 100.06, 100.08; 345/962, 963, 971, 751–753; 717/3; 715/751–753, 962, 963, 971

(56) References Cited

U.S. PATENT DOCUMENTS

| | | | | |
|---|---|---|---|---|
| 5,093,918 A | * | 3/1992 | Heyen et al. ................ | 709/215 |
| 5,490,097 A | * | 2/1996 | Swenson et al. ................ | 703/2 |
| 5,585,612 A | * | 12/1996 | Harp, Jr. ........................ | 235/51 |
| 5,675,733 A | * | 10/1997 | Williams ..................... | 709/206 |
| 5,754,857 A | * | 5/1998 | Gadol .......................... | 709/203 |
| 5,764,898 A | * | 6/1998 | Tsuji et al. .................. | 709/206 |
| 5,956,390 A | * | 9/1999 | McKibben et al. ....... | 370/93.07 |
| 5,978,836 A | * | 11/1999 | Ouchi .......................... | 709/206 |
| 6,175,859 B1 | * | 1/2001 | Mohler ........................ | 709/206 |
| 6,178,442 B1 | * | 1/2001 | Yamazaki .................... | 709/206 |
| 6,222,535 B1 | * | 4/2001 | Hurd, II ...................... | 345/733 |
| 6,250,930 B1 | * | 6/2001 | Mintz .......................... | 434/323 |
| 6,275,846 B1 | * | 8/2001 | Kondo et al. ............... | 709/200 |
| 6,314,434 B1 | * | 11/2001 | Shigemi et al. ............. | 707/203 |
| 6,324,587 B1 | * | 11/2001 | Trenbeath et al. .......... | 709/310 |
| 6,327,046 B1 | * | 12/2001 | Miyamoto et al. ......... | 358/1.15 |
| 6,327,611 B1 | * | 12/2001 | Everingham ................. | 707/10 |
| 6,332,156 B1 | * | 12/2001 | Cho et al. .................... | 709/203 |
| 6,401,111 B1 | * | 6/2002 | Dan et al. .................... | 709/204 |
| 6,549,950 B2 | * | 4/2003 | Lytle et al. ................. | 709/246 |
| 2002/0188683 A1 | * | 12/2002 | Lytle et al. ................. | 709/206 |
| 2003/0061270 A1 | | 3/2003 | Suzuki et al. | |

FOREIGN PATENT DOCUMENTS

| | | |
|---|---|---|
| EP | 0778535 A2 * | 11/1997 |
| JP | 4-294655 | 10/1992 |
| JP | 6-274493 | 9/1994 |
| JP | 6-326732 | 11/1994 |
| JP | 6-334684 | 12/1994 |
| JP | 9-181766 | 7/1997 |
| JP | 9-224050 | 8/1997 |
| JP | 10-84381 | 3/1998 |

OTHER PUBLICATIONS

Fajman, R., An Extensible Message Format for Message Disposition Notifications, RFC–2298, IETF, pp. 1–28, Mar. 1998.*

Notice of Rejection Grounds for Filing No. H10–115651; Ref. 9802844; Dispatch No. 337026; Date Dispatched: Sep. 16, 2004.

* cited by examiner

Primary Examiner—Larry D. Donaghue
(74) Attorney, Agent, or Firm—Staas & Halsey LLP

(57) ABSTRACT

A method and system of providing a receiver state list with names of receivers of a message, the title of the message, confirmation information indicating whether or not receivers of the message confirmed content of the message, completion information indicating whether or not the business related to the message is completed, and comments which the receivers prepared for the message. From the receiver state list, a sender and all receivers of the message can obtain or display the states of all the receivers and may confirm whether or not each receiver confirmed the content of the message or whether or not business related to the message is completed.

4 Claims, 32 Drawing Sheets

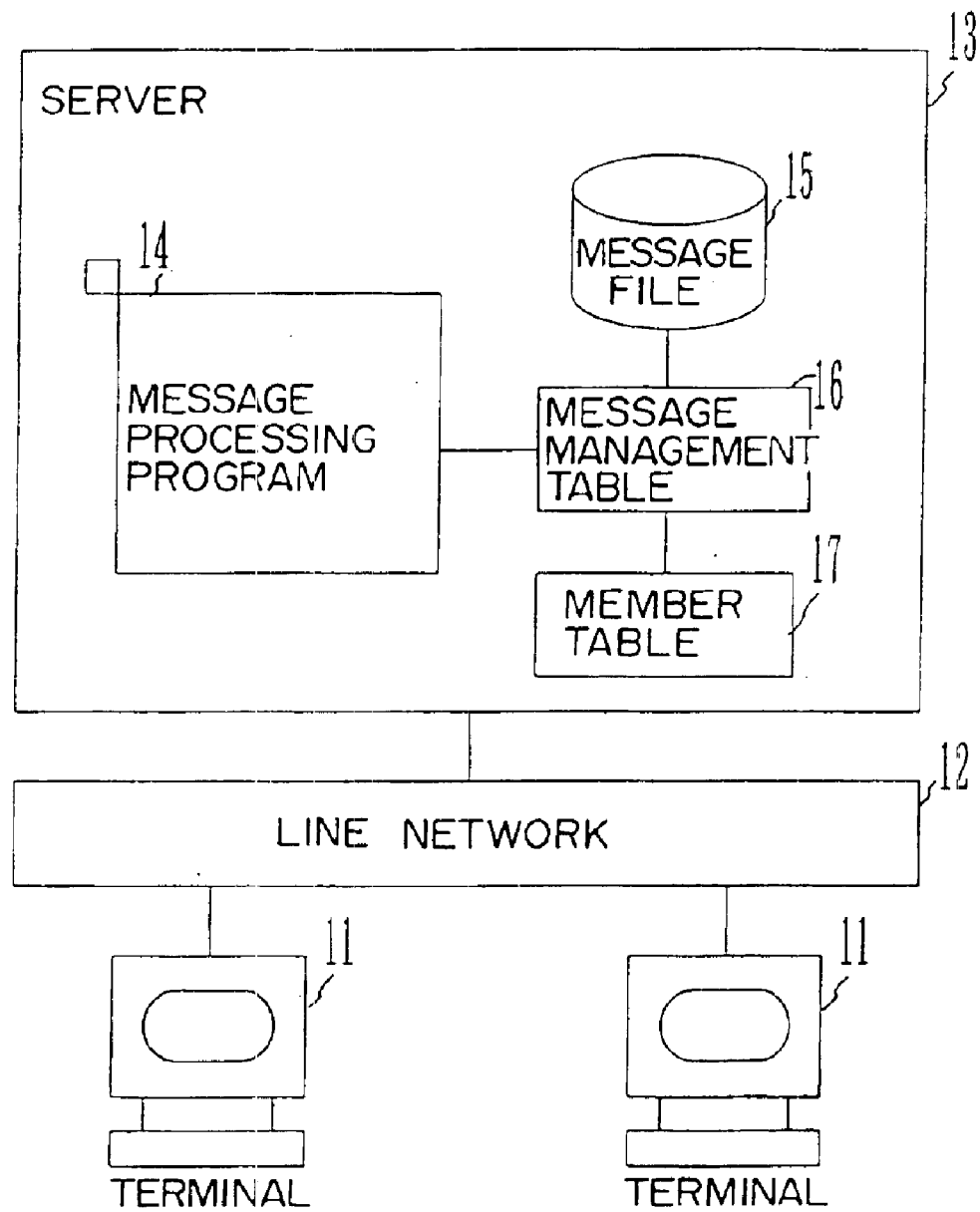
F I G. 1

15 MESSAGE FILE

| MESSAGE ID (15a) | SENDER ID (15b) | TRANSMISSION TIME AND DATE (15c) | TIME LIMIT (15d) | MESSAGE TYPE (15e) | CONFIDENTIAL (15f) | TITLE (15g) | MESSAGE CONTENTS (15h) |
|---|---|---|---|---|---|---|---|
| | | | | | | | |
| 000003 | 810050 | 1998/03/02 09:32:00 | 1998/03/30 | JOB REQUEST | | ○○ | ⋯⋯ |

| UPDATE TIME AND DATE (15i) | EXAMINER ID (15j) | EXAMINATION RESULT (15k) | APPROVER ID (15l) | APPROVAL RESULT (15m) | READABLE (15n) | COMMENT PATTERN (15p) |
|---|---|---|---|---|---|---|
| | | | | | | |

16 MESSAGE MANAGEMENT TABLE

| MESSAGE ID (16a) | RECEIVER ID (16b) | OPEN TIME AND DATA (16c) | COMPLETION TIME AND DATA (16d) | COMMENTS (16e) |
|---|---|---|---|---|
| 000001 | 850001 | | | |
| | 930085 | | | |
| 000003 | 890001 | | | |
| | 920020 | 1998/03/20 14:20:00 | 1998/03/20 14:30:00 | APPROVAL |

17 MEMBER TABLE

| MEMBER ID (17a) | NAME (17b) | GROUP TO WHICH A MEMBER BELONGS (17c) |
|---|---|---|
| 920020 | FUKO KACHO | FIRST SALES DIVISION |
| 810050 | SENJI UMIYAMA | SECOND SALES DIVISION |

FIG. 2

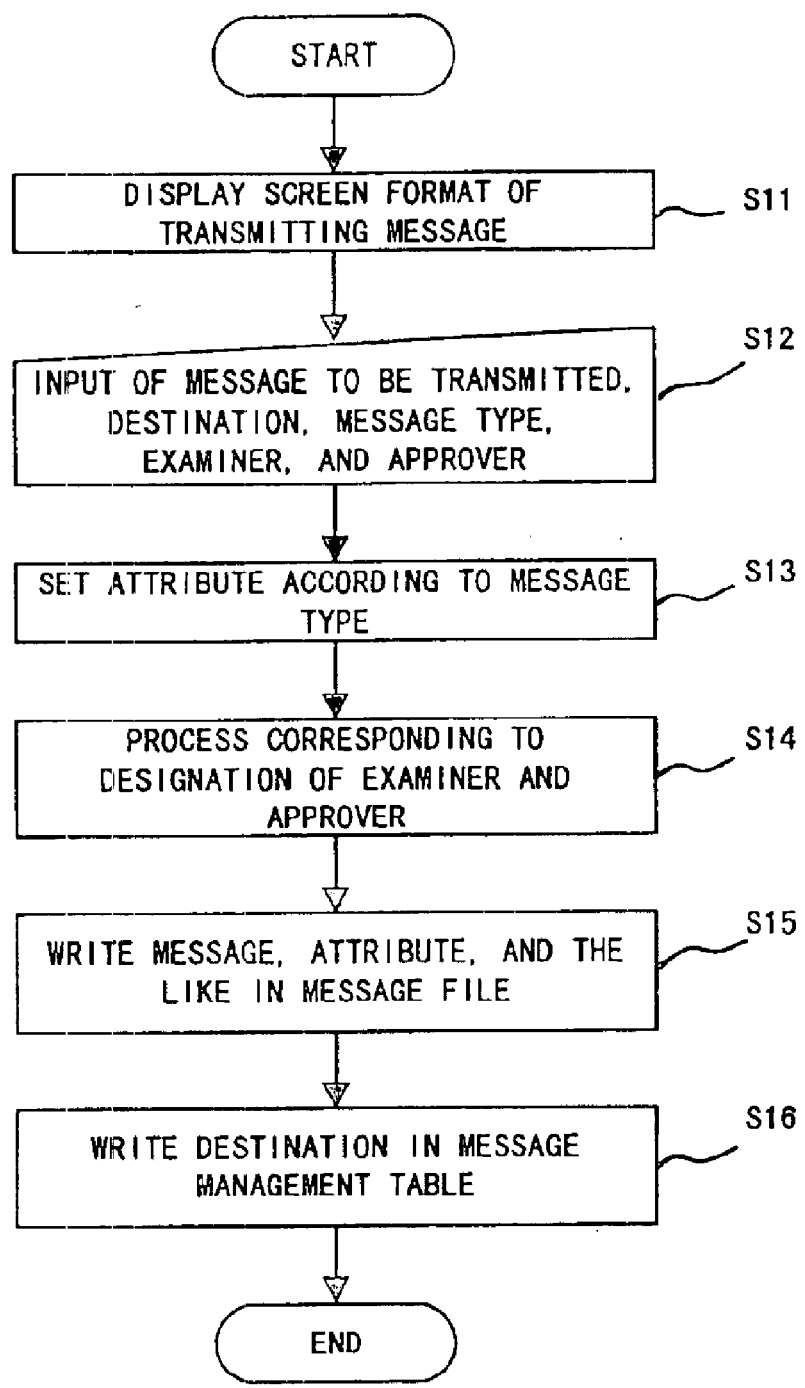
F I G. 3

| MESSAGE TRANSMISSION | | 21 — ENTER | CLEAR ~22 |
|---|---|---|---|
| DESTINATION | | | |
| MESSAGE TYPE | JOB REQUEST | | |
| TRANSMISSION DATA | 1998 / 03 / 20   09 : 32 : 00 | | |
| TITLE | ABOUT ° ° ° | | |
| TEXT | ° ° ° ° ° ° ° | | |
| SENDER'S NAME | SENJI UMIYAMA | | |
| ATTRIBUTE | ☐ INPORTANT   ☐ URGENT   ☐ COMMENTS REQUIRE<br>☐ CONFIDENTIAL   ☐ WITH TIME LIMIT ( 1998 / 04 / 15 ) | | |
| DELETION METHOD | ° ° ° ° | | |
| EXAMINATION AND APPROVAL | ☐ WITH EXAMINATION AND APPROVAL | EXAMINER : TARA SUKIYA<br>APPROVER : TAKUICHI HASHIYAMA | |

F I G.  4

| MESSAGE TYPE | STATES | TITLE | SENDER | TRANSMISSION TIME AND DATE | OPEN TIME AND DATE | TIME LIMIT |
|---|---|---|---|---|---|---|
| MESSAGE | 0/8 (0%) | ABOUT ... | KANTA NANDA | 1998/03/31 18:03:20 | NOT-OPENED | NOT-SET |
| NOTICE [IMPORTANT] | 4/12 (33%) | INFORMATION ABOUT ... | HACHIMOKU TOMITA | 1998/03/25 13:06:22 | 1998/04/06 16:30:00 | NOT-SET |
| ALL OF A SPECIFIC MATTER FULLY RECOGNIZED | 2/10 (23%) | ... NOTIFICATION | FUKO KACHO | 1998/03/23 11:23:00 | 1998/03/29 21:56:00 | NOT-SET |
| MEMORANDUM | 1/1 (100%) | ABOUT HOW TO HANDLE ... | YAMAYAMA SHIRAKI | 1998/03/31 14:00:22 | 1998/04/06 15:30:00 | NOT-SET |
| OPINIONS REQUEST | 30/100 (30%) | REQUEST OPINIONS ABOUT ... | MINAI MUGA | 1998/04/10 15:00:22 | NOT-OPENED | 1998/04/15 THREE DAYS PASSED |
| MAIL | 0/1 (0%) | ABOUT ... | SENJI UMIYAMA | 1998/04/05 14:10:00 | NOT-OPENED | NOT-SET |

F I G. 7

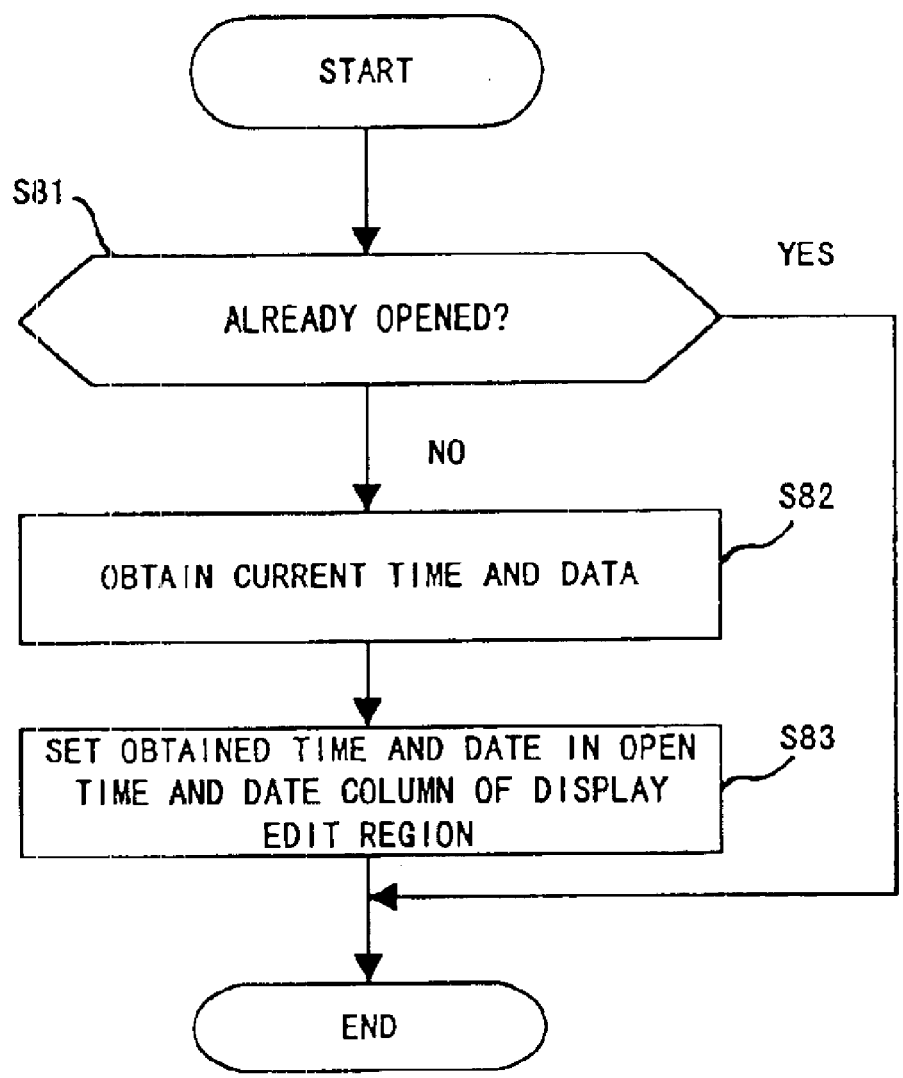
F I G. 1 0

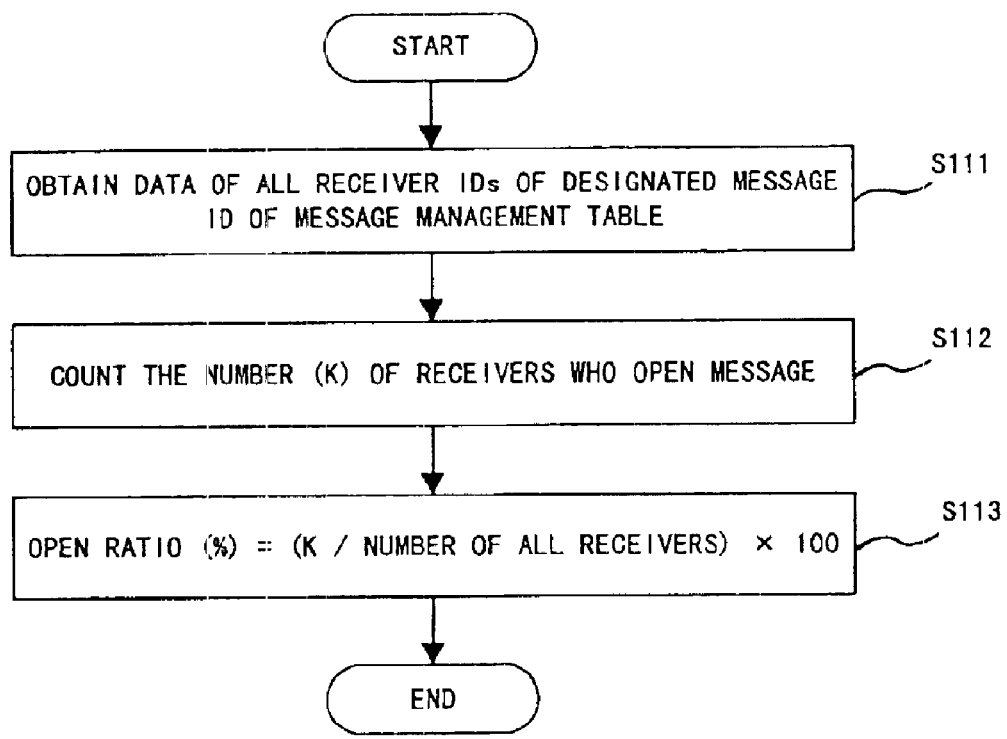
F I G. 13

| MESSAGE DISPLAY SCREEN | | | ,23 | |
|---|---|---|---|---|
| MESSAGE TYPE | MESSAGE ☐ COMPLETION CHECK | | | DEFINITION |
| COMMENTS | | | | |
| TRANSMISSION DATE | 1998 / 03 / 20  18 : 03 : 20 | | | |
| TITLE | ABOUT · · · | | | |
| TEXT | · · · · · · · · · · · | | | |
| | | 25 | 26 | 27 |
| SENDER'S NAME | SENJI UMIYAMA | RETURN | TRANSFER | EXISTING-MESSAGE-TRANSMISSION |
| MESSAGE STATES | | | | |

RECEIVER STATE LIST 24

| RECEIVER'S NAME | OPEN TIME AND DATE | STATES | COMPLETION TIME AND DATE | COMMENTS |
|---|---|---|---|---|
| FUKO KACHO | 1998 / 03 / 20 14 : 20 : 00 | COMPLETION | 1998 / 03 / 20 14 : 30 : 00 | THANK YOU FOR CONTACT |
| MINAI MUGA | 1998 / 04 / 10 10 : 10 : 10 | | | |
| TAYO GANBA | 1998 / 04 / 04 21 : 14 : 00 | COMPLETION | 1998 / 04 / 04 21 : 16 : 00 | APPROVE MESSAGE |
| | | | | |
| | | | | |
| | | | | |

FIG. 15

| MESSAGE TYPE | STATES | TITLE | TRANSMISSION TIME AND DATE | TIME LIMIT | AMENDMENT |
|---|---|---|---|---|---|
| MESSAGE | 1/3 (33%) | ABOUT ... | 1998/03/20 18:03:20 | NOT-SET | AMENDMENT / DELETION |
| NOTICE | 9/27 (33%) | INFORMATION ABOUT ... | 1998/03/19 10:03:36 | 1998/ 03/30 | AMENDMENT / DELETION |
| TIME LIMIT CHECK | 8/16 (50%) | ABOUT FILING OF ... | 1998/03/22 17:09:00 | 1998/ 04/03 | AMENDMENT / DELETION |
| JOB REQUEST | 3/20 (15%) | REQUEST FOR SUPPORT OF ... | 1998/03/20 11:05:00 | 1998/ 03/30 | AMENDMENT / DELETION |
| OPERATION REPORT | 1/2 (50%) | ABOUT PROGRESS STATES ... | 1998/04/14 14:55:00 | 1998/ 04/22 | AMENDMENT / DELETION |
| YES / NO CHECK | 3/20 (15%) | CONFIRM ATTENDANCE OR ABSENCE OF FAREWELL PARTY FOR Mr. ... or Miss ... | 1998/03/21 19:00:00 | 1998/ 03/28 | AMENDMENT / DELETION |
| CHECK WITH FILING TIME LIMIT | 5/15 (33%) | FILE ... OPERATION PROJECT | 1998/04/01 16:00:00 | 1998/ 04/10 | AMENDMENT / DELETION |

| COMPLETION STATES | UPDATE 34    NEW TRANSMISSION 35    DELETE 36 <br> ○ ○ ○ PERSONS ALREADY PERFORM COMPLETION CHECKS, AND <br> ○ ○ ○ PERSONS ALREADY OPEN MESSAGES. <br> ☐ IF MESSAGE IS UPDATED DURING CHECK PROCESS, STATES OF ALL RECEIVERS ARE RETURNED IN "NOT OPENED" STATES. |
|---|---|
| MESSAGE TYPE | MESSAGE |
| TITLE | ABOUT ・・・ |
| TEXT | ○ ○ ○ ○ |
| SENDER'S NAME | ○ ○ ○ ○ |
| ATTRIBUTE | ○ ○ ○ ○ |
| EXAMINATION AND APPROVAL | ○ ○ ○ ○ |
| DESTINATION TO BE DELETED | ○ ○ ○ ○ |
| DESTINATION TO BE ADDED | ○ ○ ○ ○ |

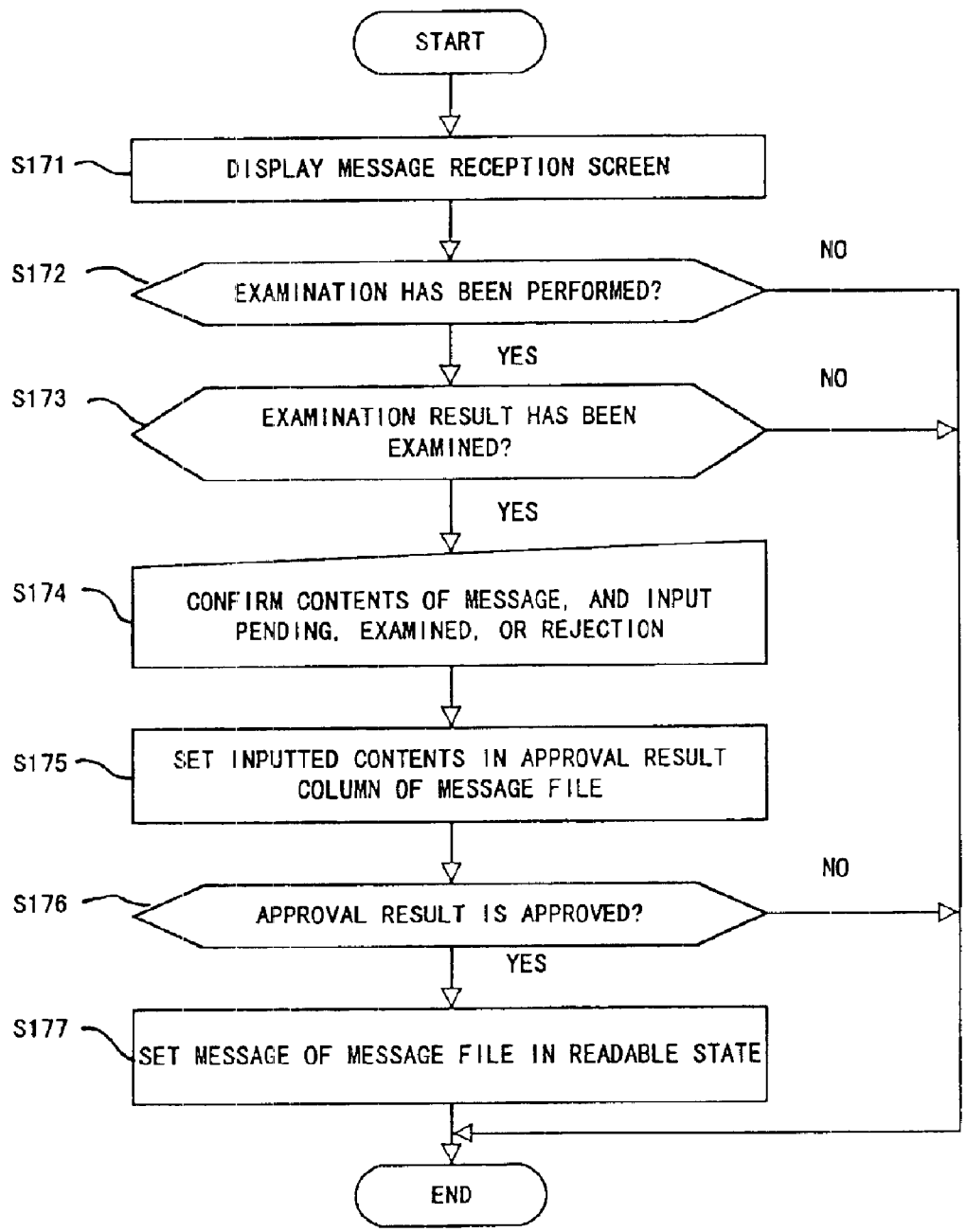
F I G. 2 1

ToDoList

| MESSAGE TYPE | MEMORANDUM [CONFIDENTIAL] □ COMPLETION CHECK | DEFINITION 23 |
|---|---|---|
| COMMENTS | | |
| TRANSMISSION DATE | 1998/04/11  11:24:20 | |
| TITLE | TRANSFER : ABOUT ○ ○ ○ | |
| TEXT | ORIGINAL MESSAGE TRANSMISSION DATE : 1998/04/10  09:20:00<br>ORIGINAL MESSAGE SENDER : MINAI MUGA<br>○ ○ ○ ○ ○ ○ | RETURN 25  TRANSFER 26  EXISTING-MESSAGE-TRANSMISSION 27 |
| SENDER'S NAME | SENJI UMIYAMA | |
| MESSAGE STATES | ○ ○ ○ | |

RECEIVER STATE LIST 22

| RECEIVER'S NAME | OPEN TIME AND DATE | STATES | COMPLETION TIME AND DATE | COMMENTS |
|---|---|---|---|---|
| SENJI UMIYAMA | 1998/04/17 15:20:00 | | | |

FIG. 23

| MESSAGE TYPE | COMMENT PATTERN | CONTENTS OF COMMENT PATTERN |
|---|---|---|
| JOB REQUEST | JOB APPROVAL | APPROVAL, REJECTION(REASON), PENDING(REASON), OTHERS( ), CONSULTATION REQUEST( ) |
| CONFIRM ATTENDANCE OR ABSENCE | ANSWER, ATTENDANCE OR ABSENCE | ATTENDANCE, ABSENCE(REASON), PENDING(REASON), OTHERS( ) |
| ° ° | | |

FIG. 24

| MESSAGE TYPE | JOB REQUEST |
|---|---|
| TRANSMISSION DATE | ○ ○ ○ |
| TITLE | ○ ○ ○ |
| TEXT | ○ ○ ○ ○ ○ |
| SENDER'S NAME | ○ ○ ○ |
| COMMENTS | JOB APPROVAL<br>☐ APPROVAL  ☐ REJECTION(REASON)  ☐ PENDING(REASON)<br>☐ OTHERS( )  ☐ CONSULTATION REQUEST( )<br>※ REASONS ⇔ IT IS IMPOSSIBLE TO TAKE THIS JOB SINCE CURRENT JOB IS VERY BUSY. JOB WILL BE ACCEPTED AFTER END OF NEXT MONTH. |
| STATUS OF MESSAGE | ○ ○ ○ |

FIG. 27

| KEYWORD TABLE NAME | KEYWORD TABLE ID | KEYWORD |
|---|---|---|
| APPROVAL OR DISAPPROVAL PATTERN | 0001 | APPROVAL, DISAPPROVAL, PENDING, ... |
| ATTENDANCE OR ABSENCE PATTERN | 0002 | ATTENDANCE, ABSENCE, PENDING, ... |
| JOB APPROVAL PATTERN | 0003 | APPROVAL, DISAPPROVAL, CONSULTATION REQUEST, PENDING, ... |
| ... | | |

FIG. 29

| KEYWORD | NUMBER OF CORRESPONDED KEYWORDS |
|---|---|
| APPROVAL | 11 |
| REJECTION | 4 |
| CONSULTATION REQUEST | 2 |
| PENDING | 3 |
| .. | |

FIG. 30

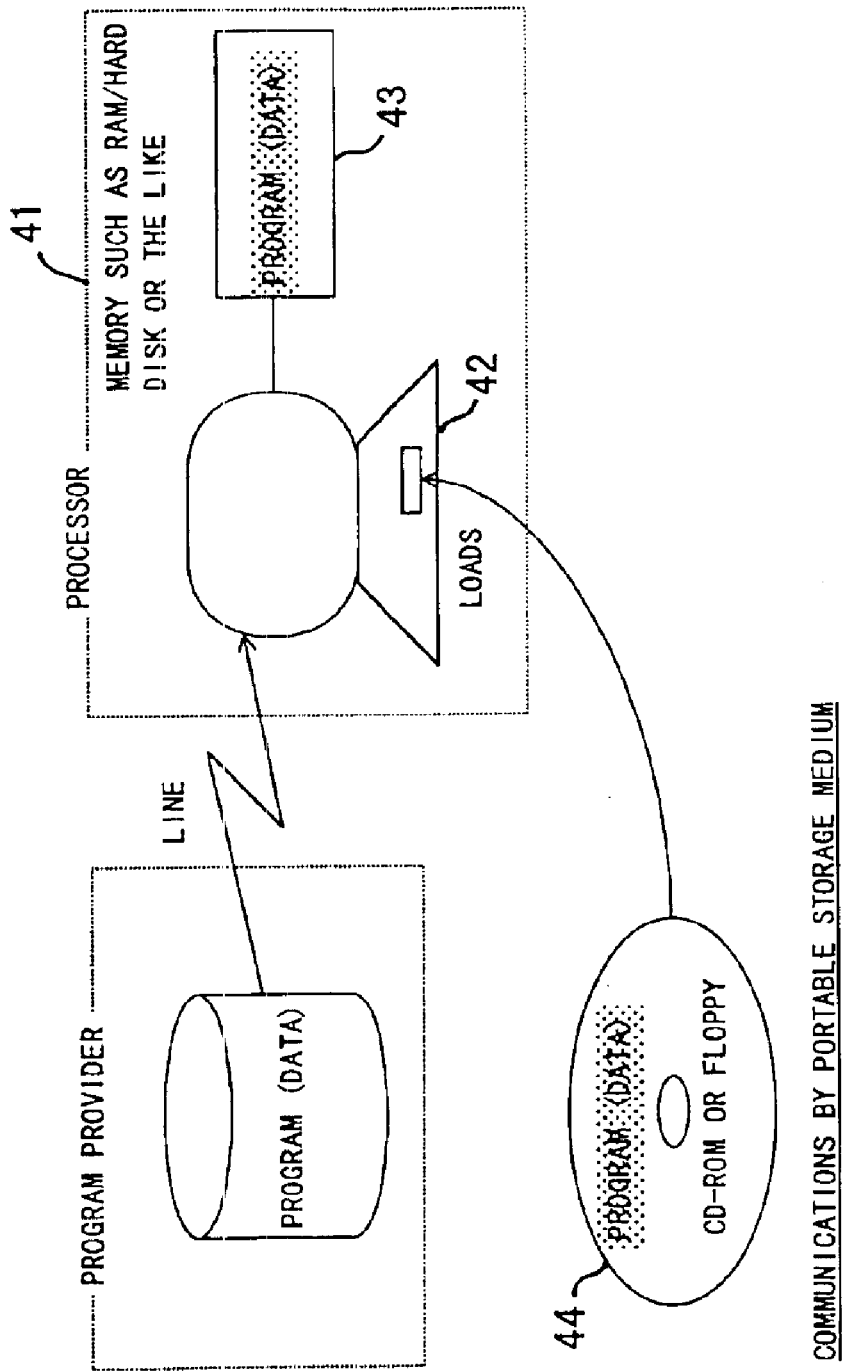
F I G. 32

MESSAGE PROCESSING DEVICE MESSAGE MANAGEMENT METHOD AND STORAGE MEDIUM FOR STORING MESSAGE MANAGEMENT PROGRAM

BACKGROUND OF THE INVENTION

1. Field of the Invention

The present invention is related to a message processing device, a message processing system, and a message management method, for processing a message transmitted from a terminal, and a storage medium in which a message management program is stored.

2. Description of the Related Art

Recently, the following technology has been easily realized. That is, an electronic mail can be transmitted to an individual receiver by a mail system such as a personal-computer communications system, a UNIX system or the like, and the same mail can be transmitted to a plurality of receivers.

There is a case where, when a plurality of members cooperatively do business, a leader transmits mails to the members to confirm whether or not the members have completed the business activity, in order to determine the business progress states of the members. In such a case, each member of the group prepares a mail for reporting whether or not his or her business activity has been completed, and transmits this mail to the leader. The leader reads the mails from all the members, and determines whether or not the business of each member has been completed. In such a case, the number of mails to be read increases as the number of members increases, and so the readers job increases.

Further, in order that a member other than the leader determines the progress states of other members, he or she should send mails to the other members to confirm their progress states in a fashion similar to that mentioned above, and should receive their responses. Therefore, the process of transmitting and receiving mails between members becomes complicated.

The displaying of received mails as a list has been conventionally performed, but in the conventional method, only a list is displayed.

There are many cases in which, when a mail is transmitted, a sender wishes to know whether or not the receiver confirms the contents of the mall. In a conventional electronic mail system, however, the sender can determine whether or not the receiver opened the mail but cannot determine whether or not the receiver actually confirms the contents of the mail. In a personal computer communications system or the like, when a receiver reads out a mail which has been stored in a host computer, a sender is informed that this mall has been opened. According to this method, even if the terminal provided on a receiving side automatically reads out a mail from a host computer, this mail is handled as opened. Therefore, a sender cannot determine whether or nota receiver actually confirms the contents of a mail.

Conventionally, the processing flow of business is transmitted by mail. However, a process of displaying the list of mails including a formatted message about business and that of a mail including a non-formatted message to an individual receiver, on a same display, thereby managing the mails, has not yet been performed.

SUMMARY OF THE INVENTION

An object of the present invention is to determine the states of the receiver of a message. Another object is to display the contents of a message and the states of a receiver linked with each other, on a terminal. Still another object is to make clear whether or not the receiver of a message confirms the contents of a message or whether or not he or she completes the business related to this message. A further object is to display the formatted message related to a business processing and the non-formatted messages other than this formatted message together with a message type so that the received messages can be uniformly managed.

The present invention includes a preparation portion for preparing a receiver state list for displaying the states of receivers of messages whose destinations are a plurality of receivers, and a management portion for managing the information of the receiver state list, in a message processing device for processing messages transmitted from a plurality of terminals.

For example, completion information which indicates that a receiver of the message confirms the contents of the message or that the business related to the message is completed, is included in the receiver state list. Thus, the sender of a message or receivers thereof can determine whether or not all the members who received the messages have confirmed the messages or whether or not the businesses related to the messages have been completed, by looking at the receiver state list. Accordingly, the states of all the receivers can be obtained simultaneously.

By displaying the comments to the received message on the receiver state list, which is prepared by the receiver, it can be determined whether or not the message is accurately transmitted to a receiver, or whether a receiver approves or disapproves of the message.

Further, by displaying the contents of a message and the receiver state list linked with each other on a terminal, the sender of a message and all the receivers can grasp the contents of the message as well as the states of each receiver of the message, simultaneously.

A message management method of the present invention is used to display the formatted message related to a business process and the non-formatted message other than this business together with the message type as a receiver state list.

According to the present invention, the list of a formatted message such as a work flow and a non-formatted message such as a mail to an individual receiver are displayed together with the message type as a message list. Therefore, it can be determined from the message type whether each message is related to a business mail or a personal mail.

Further, according to the message management method of the present invention, a receiver state list for displaying the states of a plurality of receivers of messages whose destinations are a plurality of receivers is displayed on a terminal.

The present invention can obtain the states of all the receivers who have received the messages asking, for example, whether or not they have confirmed the contents of messages or whether or not the businesses related to these messages have been completed.

BRIEF DESCRIPTION OF THE DRAWINGS

FIG. 1 is a block diagram showing a system configuration of the message processing system according to an embodiment of the present invention;

FIG. 2 shows configurations of a message file 15, a message management table 16, and a member table 17;

FIG. 3 is a flowchart showing the outline process of transmitting a message;

FIG. 4 is a table showing the display states at the time of transmitting a message;

FIG. 7 is a list showing received messages;

FIG. 10 is a flowchart showing the process of setting date and time when a mail is opened;

FIG. 13 is a flowchart showing the process of calculating an open ratio;

FIG. 15 is a table showing a display state in which messages and a receiver state table are displayed linked with each other;

FIG. 17 is a received-message list 31;

FIG. 18 is a diagram showing a message edition screen;

FIG. 21 is a flowchart showing an approval process;

FIG. 23 is a table showing a to-do list;

FIG. 24 is a table showing the data configuration of a message type/comment pattern table 32;

FIG. 27 is a screen for inputting a chosen comment;

FIG. 29 is a table showing the data structure of a keyword table 33;

FIG. 30 is a table showing the data structure of an active keyword table 34;

FIG. 32 is a diagram explaining the case where a program is stored in a storage medium.

DESCRIPTION OF THE PREFERRED EMBODIMENTS

Figure 5:
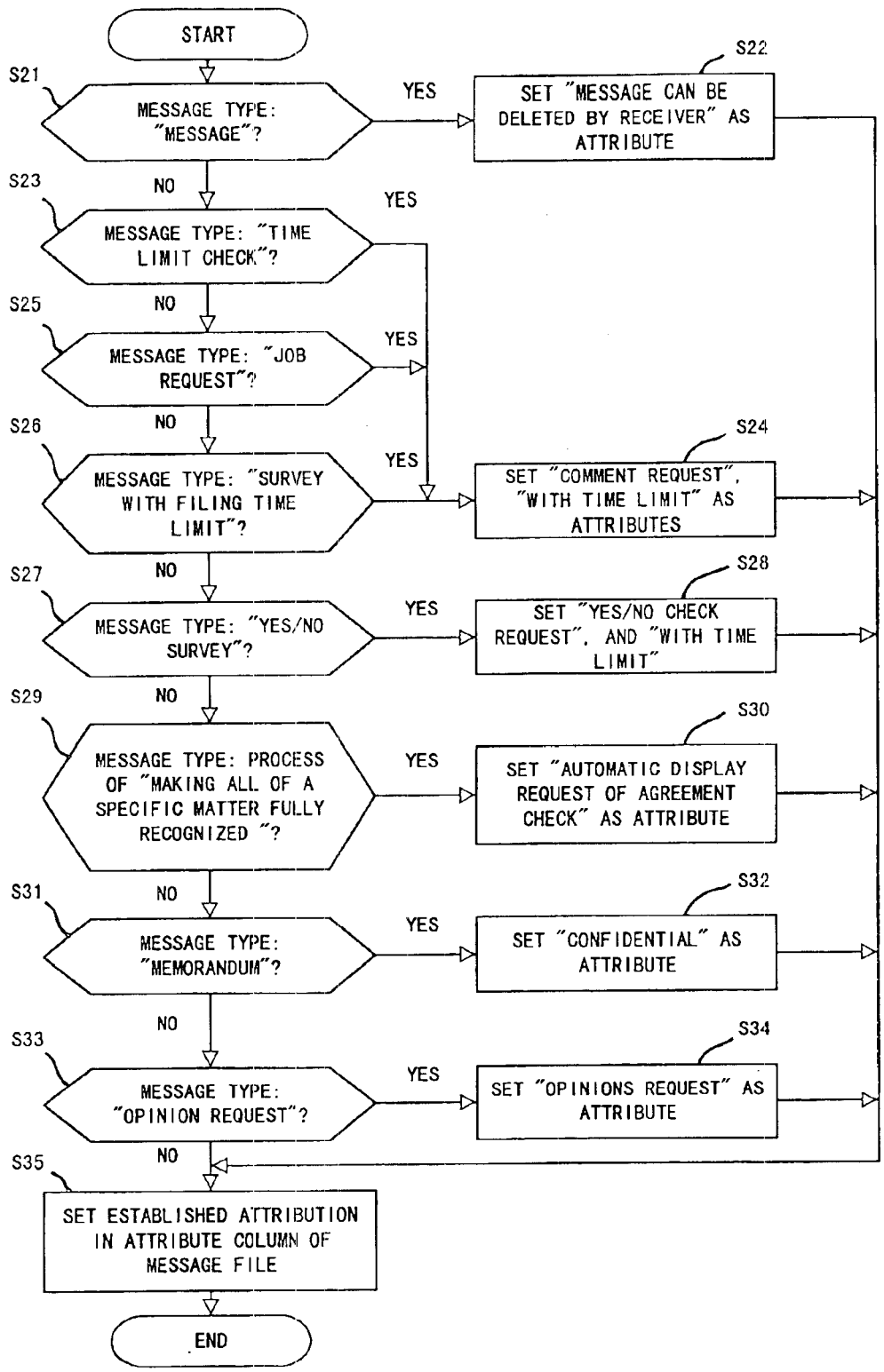
FIG. 5 is a flowchart showing setting attributes based on the types of messages to be transmitted.

Embodiments of the present invention will be explained below with reference to the drawings. FIG. 1 is a block diagram showing the system configuration of a message processing system according to an embodiment of the present invention.

According to this message processing system, a plurality of terminals 11 are connected to a server 13 through a line network 12 such as a LAN or the like. A message processing program 14 of the server 13 has the functions of preparing and transmitting a message for the terminals 11, as well as a function of displaying the list of to the received m messages, the list of messages to be transmitted, received messages, and the like. A message file 15 is file in which the information on a message sender side is stored. The title of the message, a sender ID, the contents of the message, or the like are stored in the message file 15. A message management table 16 is a table in which the information on a message receiver side is stored. A receiver ID, completion time and date, and comments to a message or the like are stored in the message management table 16. A member table 17 is a table for storing information about members who are destinations of messages. In this table, a member ID, names, a group which the members belong to or the like are stored. A message management table 16 is a table in which the information on a message receiver side is stored. A receiver ID, completion time and date, and comments to a message or the like are stored in the message management table 16. A member table 17 is a table for storing information about members who are destinations of messages. In this table, a member ID, names, a group which the members belong to or the like are stored.

FIG. 2 shows configurations of the message file 15, the message management table 16, and a member table 17, which are mentioned above.

The message file 15 includes a region 15a for storing a message ID to be assigned to each message, a region 15b for storing a sender ID, a region 15c for storing a transmission time and date, a region 15d for storing the due date of a response to the message, a region 15e for storing a message type such as a job request, a display operation or the like, a region 15f for storing information about whether or not the message is confidential, a region 15g for storing a title, and a region 15h for storing the contents of the message. Further, the message file 15 includes a region 15i for storing a time and date when a message is updated, a region 15j for storing the ID of an examiner who examines whether or not the message is approved a region 15k for storing examined results, a region 15L for storing the ID of an approver who approves the message after this message is examined, a region 15m for storing the approved results; a region 15n for storing the information about whether or not the examined and approved message is readable, and a region 15p for storing a comment pattern which is specified by the sender. The message file 15 further includes regions for storing attribute information such as the requirement for comments, important comment, urgent comment or the like, other than the above mentioned regions.

The message type is the information indicating which one of a job request, an investigation, a process of making all of a specific matter fully recognizable, a requirement for opinions or requests from the members, or the like, is the content of a message. According to the present embodiment, if a message type is selected by a sender when a message is prepared, an attribute such as the requirement for the comment to be included in response, the requirement for a NO/YES answer or the like, is automatically set according to e thus-selected message type. where the investigation with a time limit, for example is selected as a message type, attributes of a "requirement for comments", and "with a time limit" are automatically set for the message. Accordingly, the sender does not need to set every attribute of all the messages.

Next, the message management table 16 includes a region 16a for storing message ID, a region 16b for storing a receiver ID, a region 16c for storing a lime and date when the message is opened, a region 16d for storing the completion time and date when the receiver opened the message and operated a definition button which will be described later, and a region 16e for storing comments to the message. The data stored in the message management table 16 are corresponded to the data stored in the message file 15 by the message ID.

The member table 17 includes a region 17a for storing the member ID, a region 17b for storing a name, and a region 17c for storing a group to which the members belong. This member table 17 is used for looking for a member ID when the group to which the member belongs to and the name are designated.

Next, the operations of a message processing system having the above-mentioned configuration will be explained. FIG. 3 is a flowchart showing the outline process of transmitting a message.

First, a sender inputs a user ID from the terminal 11 and logs on to the server device 13. When the sender performs operations for newly transmitting a message, a message processing program 14 of the server 13 displays a preparation screen for newly transmitting a message on the terminal 11 (S11 shown in FIG. 3).

FIG. 4 is a table showing the display state at the time of transmitting a message. Sections for inputting a destination, a message type, a title, a text or the like are displayed. On the right of the display screen, an enter button 21 and a clear button 22 are displayed. When a message is prepared and the enter button 21 is clicked, the message is transmitted, and the data which are inputted to the message file 15 are written in these sections. When the clear button 22 is clicked, the inputted data are cleared.

The sender of a message inputs the text of a message to be transmitted, and at the same time sets a destination, a message type, and the necessity or unnecessity of examination and approval. When the examination and approval are required, the sender sets the names of an examiner and an approver (S12). The destination, the message type, and the like can be optionally selected from predetermined alternatives.

When the message type is inputted, the message processing program 14 of the server 13 sets attributes corresponding to this message type (S13).

When a box indicating "with examination and approval" is clicked, and the names of an examiner and an approver are set, a check box provided in the section of "with examination and approval" is displayed in black, and a process corresponding to the designation of the examiner and the approver is performed (S14).

Next, a sender ID, a message ID, a message type, a time limit, an examiner ID, an attribute corresponding to a message type, information indicating that only the examiner, approver, and sender can read the message, and the like are inputted in the message file 15 (S15).

Therefore, when a sender selects a job request as a message type as shown in FIG. 4, a "requirement for comments" and "with a time limit" are automatically set as attributes. Since the check boxes provided in "a requirement for comments" and "with a time limit" section are displayed in black as shown in FIG. 4, the sender does not need to set every attribute.

When the "requirement for comments" is set as the attribute of a message, a state of the message receiver is not in a termination state until the sender inputs comments even if a message is opened on a receiver side, and the definition button is clicked. When a time limit is set, and this time limit expires without completing a business, the sender can recognize the presence of a message which should be urgently handled, since the number of days delay from the time limit is displayed on a received message list, which will be described later.

When a destination is designated by a sender, and the enter button 21 is clicked, a receiver ID is written corresponding to the message ID of the message management table 16. Further, that time is written in the region 15c for storing the transmission time and date of the message file 15, as a transmission time and date (S16).

Next, a process of setting attributes corresponding to the message type of step S13 shown in FIG. 3 will be explained with reference to the flowchart shown in FIG. 5.

First, it is determined whether or not a message type is a "message" (S21 shown in FIG. 5). When the message type is the "message", the flow advances to step S22, and "capability of deleting a message by a receiver" is set as the attribute of the message.

When it is determined in step S21 that the message type is not a "message" (NO in step S21), the flow advances to step S23, and it is determined whether or not the message type is a "time limit check". If the message type is the "time limit check", the flow advances to step S24, and the "requirement for comments" and "with a time limit" are set as attributes.

When it is determined in step S23 that the message type is not the "time limit check" (NO in step S23), the flow advances to step S25, and it is determined whether or not the message type is a "job request". If the message type is the "job request", the flow advances to step S24, and the "requirement for comments" and "with a time limit" are set as attributes.

When it is determined in step S25 that the message type is not the "job request" (NO in step S25), the flow advances to step S26, and it is determined whether or not the message type is a "check with a filing time limit". If the message type is the "check with a filing time limit", the flow advances to step S24, and the "requirement for comments" and "with a time limit" are set as attributes.

When it is determined in step S26 that the message type is not the "check with a filing time limit" (NO in step S26), the flow advances to step S27, and it is determined whether or not the message type is a "YES/NO check". If the message type is the "YES/NO survey", the flow advances to step S28, and the "requirement for a YES/NO check" and "with a time limit" are set as attributes.

When it is determined in step S27 that the message type is not the "YES/NO check" (NO in step S27), the flow advances to step S29, and it is determined whether or not the message type is a "process of making all of a specific matter fully recognized". If the message type is the "process of making all of a specific matter fully recognized", the flow advances to step S30, and the "requirement for the automatic display of an agreement check" is set as an attribute.

When it is determined in step 529 that the message type is not the "proves of making all of a specific matter fully recognized" (NO in step 829), the flow advances to step S31, and it is determined whether or not the message type is a "memorandum". If the message type is the "memorandum", the flow advances to step S32, and "confidential" is set as an attribute. If the "memorandum" is set as a message type when preparing a message, this message designates the sender, and the attribute becomes confidential. Therefore, the sender can store this message so it is only seen by the sender.

When it is determined in step S31 that the message type is not the "memorandum" (No in step S31), the flow advances to step S33, and it is determined whether or not the message type is a "requirement for opinions". If the message type is the "requirement for opinions", the flow advances to step S34, and the "requirement for comments" is set as an attribute.

When it is determined in step S33 that the message type is not the "requirement for opinions", that is, the message type does not correspond to any one of the above-mentioned items, or the attribute according to the message type is set in the attribute section on the message preparation screen, attributes which are set in the attribute section are written in the corresponding region of the message file 13 (S35).

As mentioned above, an attribute for requesting a receiver to input comments, to answer YES or NO, or the like is set according to the message type. Then the receiver performs operations according to this request. Thus, it can be confirmed whether or not the subject of the message is accurately informed to the receiver or whether the receiver approves or disapproves of the message.

The displaying, returning, transferring, and the transmitting processes of the thus-transmitted message will be explained with reference to the flowchart shown in FIG. 6.

When the user of the terminal 11 performs the operations of displaying the received message, the message processing program 14 of the server 13 detects the message ID of the received message from the message management table 16 using the user ID. Then, a list 20 of the received message as shown in FIG. 7 is displayed (S41 shown in FIG. 6).

Here, the contents of the process of displaying the received message list 20 in step S41 shown in FIG. 6 will be explained with reference to the flowchart shown in FIG. 8.

Figure 8:
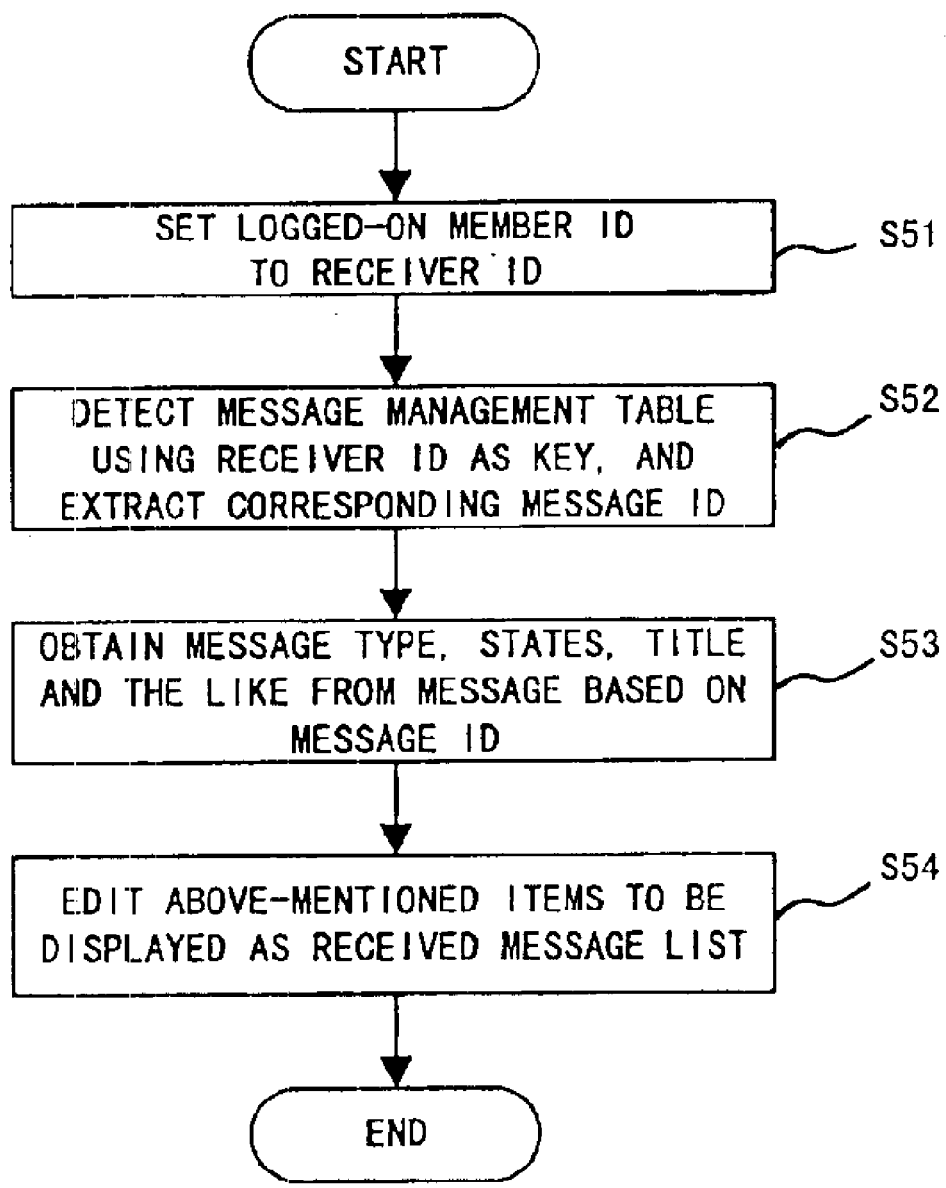
FIG. 8 is a flowchart showing the process of displaying a received message list.

First, the member ID of a user, who is logged on to the terminal 11 to which a request of displaying the message list has been made, is set as a receiver ID (FIG. 8, S51). Next, the message management table 16 is detected using the receiver ID as a key, and a corresponding message ID is extracted (S52). Then, the message type, the state, the title of each message and the like are obtained from the message file 15 based on the thus-extracted message ID (S53). The information about each of the thus-obtained items is edited to be displayed on a corresponding terminal 11 as the received message list 20 (S54).

Before opening a message, the receiver can determine from the received message list 20 shown in FIG. 7, which kind of message the received message is, that is, a job request, a time limit check, a process of making all of a specific matter fully recognized, a personal mail, or the like. Further, the receiver can determine whether or not the message is an urgent message, an important message or the like, from the attribute information.

Both a formatted message such as a business work flow, and a non-formatted message such as a personal mail, can be displayed on the received message list 20 together with the message type. Therefore, the receiver can simultaneously manage all the received messages.

Further, the receiver can determine whether or not a not-opened massage or a message of which a time limit has expired is present. Further, the receiver can also determine the answer states, how many members have completed their businesses, and what the completion ratio is, from the completion states of the messages. If a time limit expires in an unfinished state, a flame mark or a receiver's angry face, etc. which is not shown in FIG. 7, is displayed, and this mark or face gradually becomes larger as the number of days delay from the time limit increases, thereby informing the receiver of the degree of delay.

Figure 6:
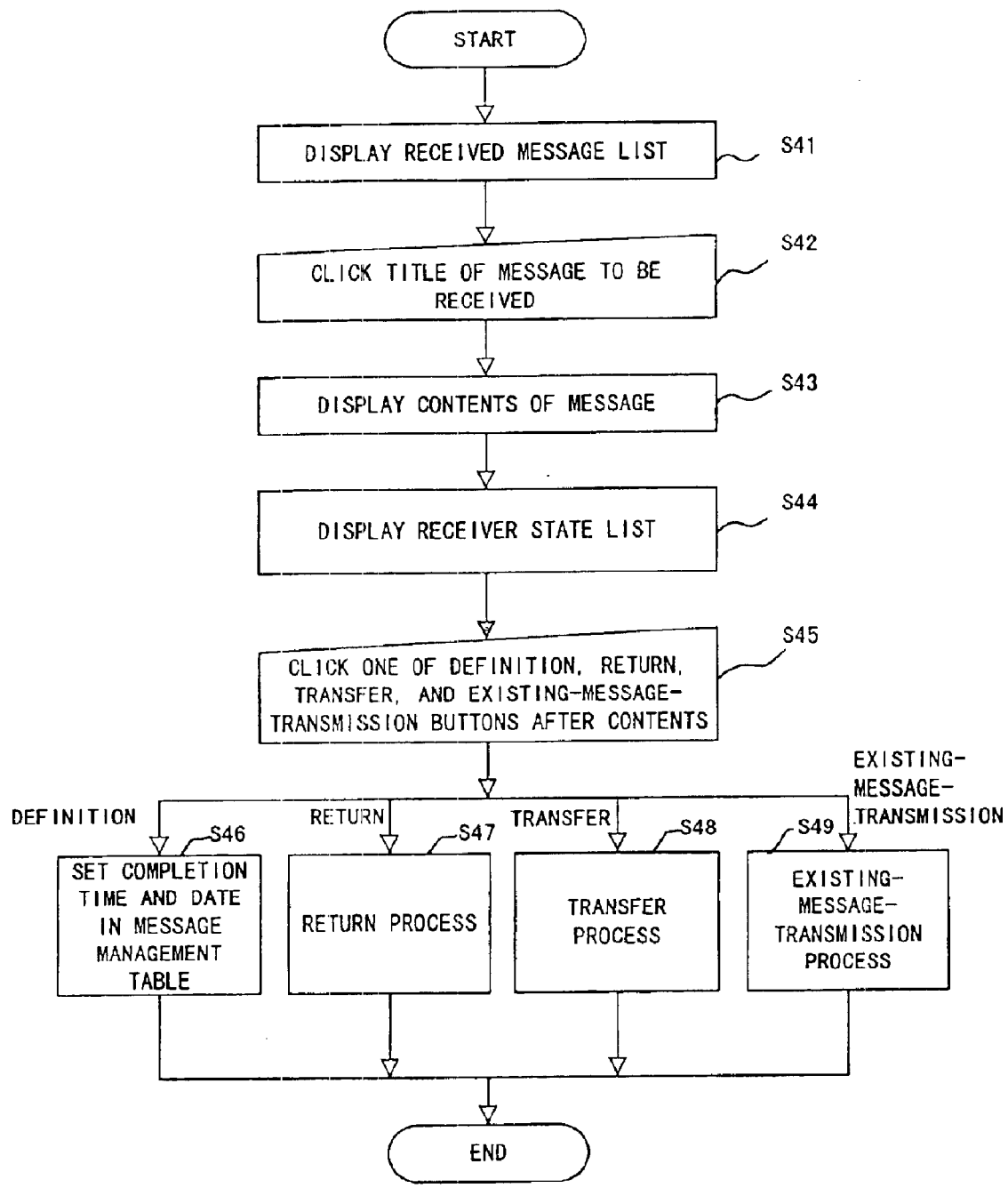
FIG. 6 is a flowchart showing displaying, returning, transferring, and transmitting processes of existing messages.

In the case where the receiver wishes to read a message as shown in FIG. 6, he or she clicks the title of a message of the received message list 20, which the receiver wishes to open (S42). When instructed to open the message, the message processing program 14 of the server 13 reads out the contents of the designated message from the message file 15, and displays the thus-read-out message on the screen of the terminal 11 (S43). Further, a receiver state list 24 indicating the completion state of the receiver of the message, comments, and the like are displayed on the terminal 11 linked with the message (S44).

A process of displaying a received message and the receiver state list 24 linked with each other will be explained with reference to the flowcharts shown in FIGS. 9 to 14 and the display states shown in FIG. 15.

Figure 9:
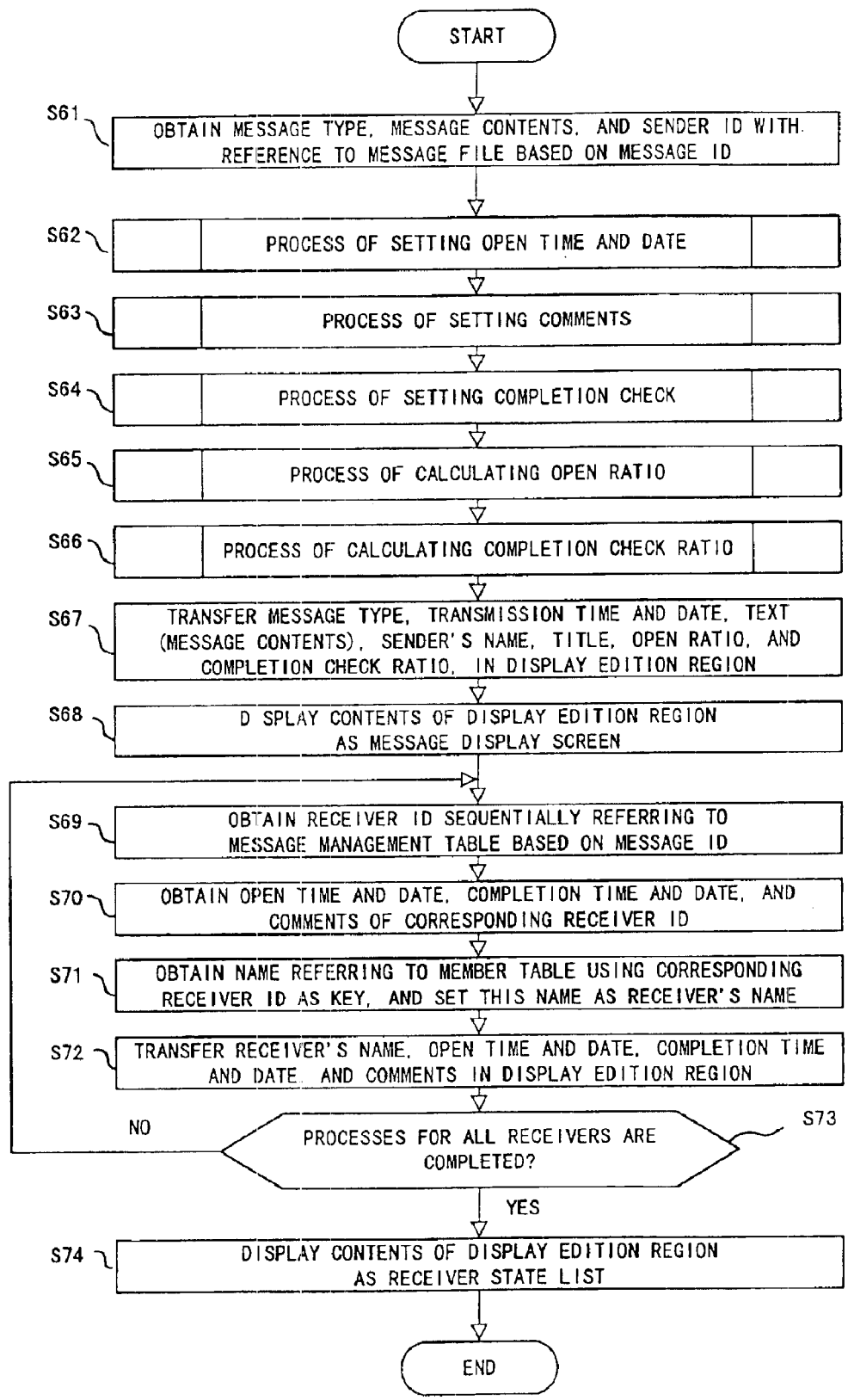
FIG. 9 is a flowchart showing the process of displaying messages and a receiver state list 24 linked with each other.

First, the message type, the title, the transmission date, the message contents, and the sender ID of each message are obtained based on the message ID of the received message list 20 (S61 shown in FIG. 9). Then, a process of setting the time and date when a message is opened, which is shown in step S62, is performed.

The process of setting the time and date when a message is opened will be explained with reference to FIG. 10. First, it is determined whether or not a message is opened according to a fact that whether or not the time and date has been stored in the region 16c, of the message management table 16, for storing the time and date when a message was opened (S81 shown in FIG. 10). In the case where the message has been opened, the process terminates at this point. In the case where the message is not opened, the current time and date are obtained since the message is opened for the first time (S82). Then, the thus-obtained time and date are set as the open time and date, in the open time and data section of the display and edition region of a message (S83).

Next, a process of setting comments in step S63 shown in FIG. 9 is performed.

Figure 11:
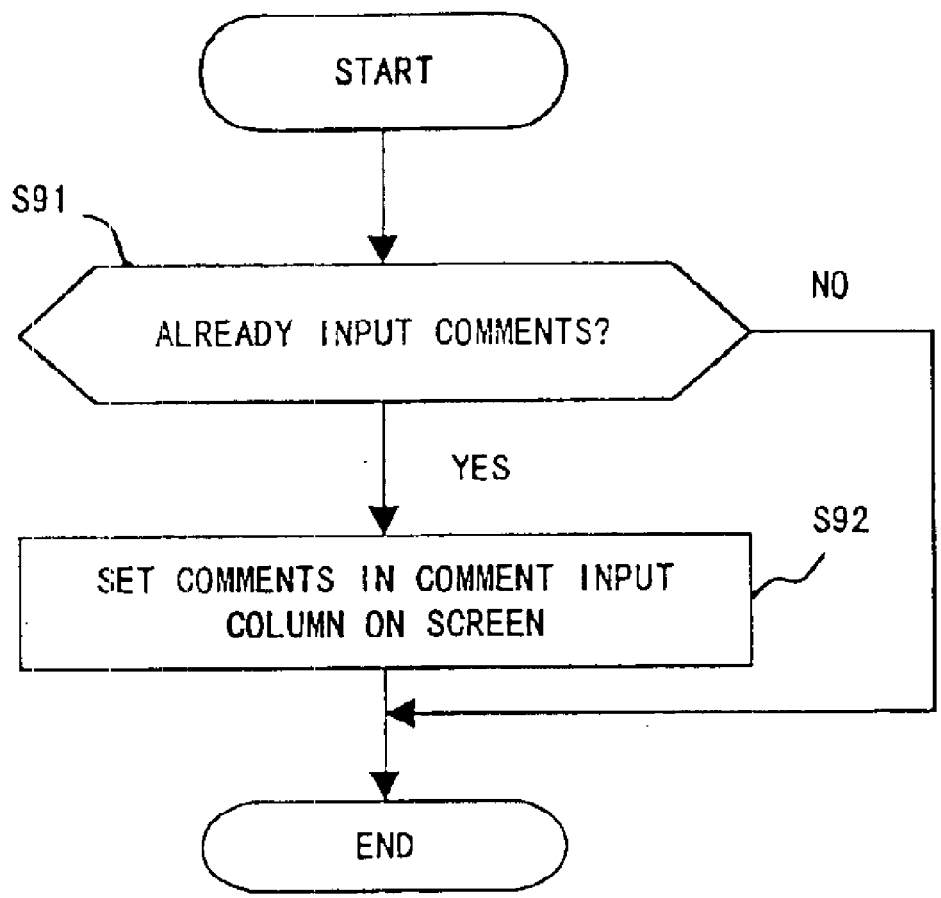
FIG. 11 is a flowchart showing setting a comment.

This process of setting comments will be explained below with reference to FIG. 11. The message management table 16 is detected using the message ID and the receiver ID. Then, it is determined whether or not comments are stored in a storage region 16e for storing the comment, corresponding to the message ID and the receiver ID (S91 shown in FIG. 11). In the case where comments are not stored, the process terminates at this point. In the case where comments are stored in the region 16e of the message management table 16, these comments are set in a comment input section on the screen (S92).

Thus, in the case where the receiver has already set comments in a message, the thus-set comments are displayed in the comment input section of the message.

Then, a completion check process in step S64 shown in FIG. 9 is performed.

Figure 12:
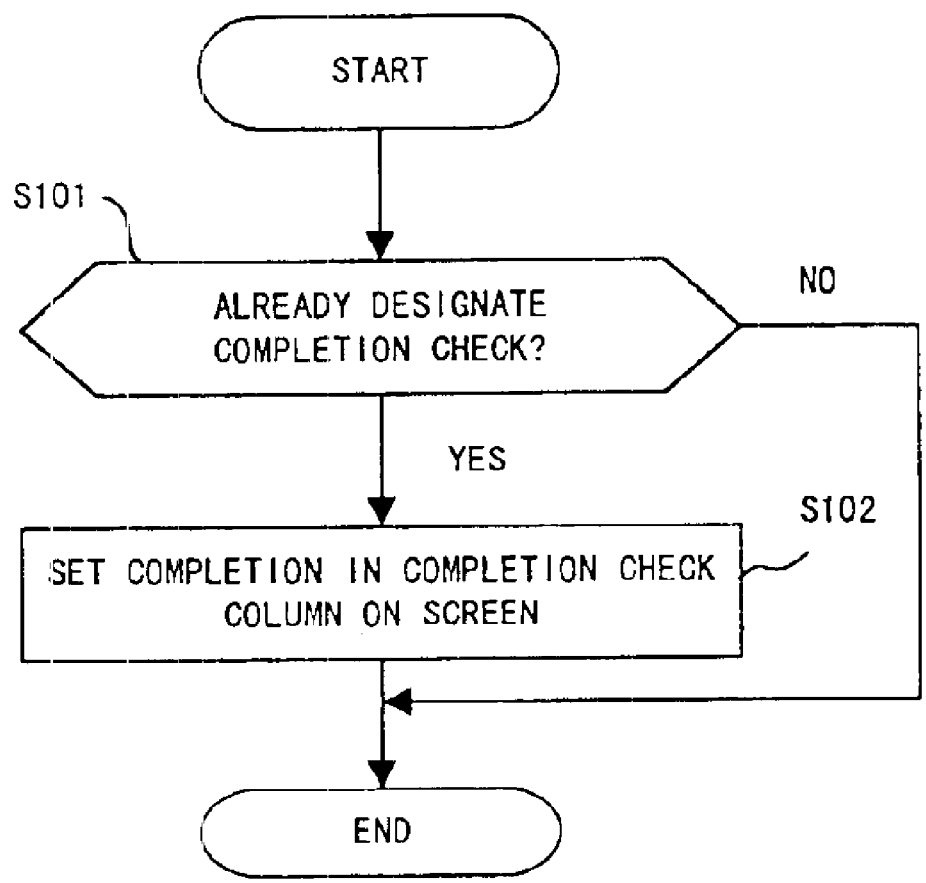
FIG. 12 is a flowchart showing a completion check process.

This completion check process will be explained with reference to FIG. 12. First, it is determined whether or not a completion check is designated, that is, whether or not a receiver has already operated the definition button 23 after confirming the contents of a message (S101 shown in FIG. 12). In the case where the completion check is not designated, that is, the receiver has not performed operations for the completion, the process terminates at this point. In the case where the completion check is designated, on the other hand, a completion operation is set in the completion check section on the screen (S102).

A process of calculating an open ratio in step S65 shown in FIG. 9 is performed.

The process of calculating an open ratio will be explained with reference to the flowchart shown in FIG. 13. First, data of all the receivers corresponding to the designated message ID are obtained from the message management table 16 (S111 shown in FIG. 13). Next, the number of receivers whose open time and date are set in the message management table 16 is calculated (S112). Then, the number K of receivers who opened the messages is divided by the number of all the receivers so that the open ratio is obtained by multiplying the resultant number by [100] (S113).

Next, a process of calculating a completion check ratio is performed in step S66 shown in FIG. 9.

Figure 14:
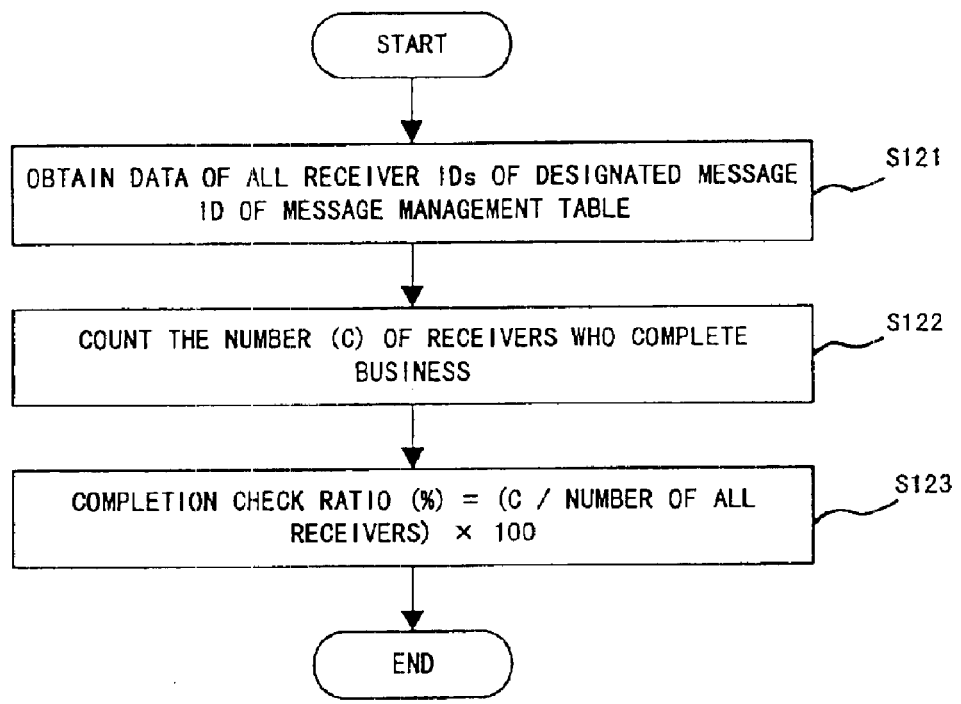
FIG. 14 is a flowchart showing the process of calculating a completion check ratio.

This process of calculating a completion check ratio will be explained with reference to the flowchart shown in FIG. 14. First, data of all the receivers corresponding to the designated message ID are obtained from the message management table 16 (S121 shown in FIG. 14). Next, the number of receivers whose completion dates are set is calculated (S122). Then, the number C of receivers who have completed their businesses is divided by the number of all the receivers so that the completion check ratio is obtained by multiplying the resultant number by [100] (S123).

In step S67 shown in FIG. 9, the message type, the transmission time and date, the title, the contents of a message, the sender's name, the open ratio, and the completion check ratio which are obtained according to the above-mentioned processes are transferred to the display and edit region for storing display data at the time of editing a message. Then, the data stored in the display and edit region are displayed as a message display screen (S68).

Next, a receiver ID is obtained by referring to the message management table 16 according to the message ID of the selected message (S69). In this process, the message management table 16 is detected using the massage ID as a key so that the corresponding receiver ID is obtained.

Next, the open time and data, the completion time and data, and comments which are stored corresponding to the receiver ID are obtained (S70). In this case, data in which the open time and data, and the completion time and data have not been stored, are handled as not-opened and not-completed data. Further, a name corresponding to the receiver ID is obtained by referring to the member table 17 using a receiver ID as a key. Accordingly, the thus-obtained name is set as a receiver's name (S71).

The receivers name, the open time and data, the completion time and data, and comments which are obtained by the above-mentioned processes are transferred to the display and edit region (S72). It is determined whether or not processes terminate for all the receivers stored in the message management table 16, corresponding to the message ID (S73). where processes do not terminate for all the receivers, the process returns in step S69, and the above-mentioned processes are repeated. where processes terminate for all the receivers, on the other hand, the contents of the display and edit region are displayed as the receiver state list 24 (S74).

According to the above-mentioned processes, a received message and the receiver state list 24 are displayed linked with each other. After the process returns to processes shown in FIG. 6, the receiver closes the message by operating one of the definition button 23, a return button 26, and an existing-message-transmission button 27, shown in FIG. 15, while the message and the receiver state list 24 are being displayed (S45).

In the case where the definition button 23 is operated, the process advances to step S46, and the current time and data are written in the region 16d for storing completion time and data in the message management table 16. If comments are inputted, the thus-inputted comments are written in the storage region 16e for storing a comment.

In the case where the return button 25 is operated, the process advances to step S47, and a return process is performed for newly preparing a message which designates a sender of the message as a destination.

where the transfer button 26 is operated, the process advances to step S48, and a transfer process is performed for transferring the received message to another person as it is. Further, where the existing-message-transmission button 27 is operated, the process advances to step S49, and an existing-message-transmission process is performed for preparing a new message using the text of the received message.

FIG. 15 shows tables indicating the display states when a message and the receiver state list 24 are displayed linked with each other according to the above-mentioned processes.

When the title of a specific message is clicked while the received message list 20 is being displayed, the message type, the title, the contents of the message, and the like are displayed. If this is the first opening, the current time and date are stored in the region 16c for staring the time and date when the message management table 16 is opened. After the contents of the message are confirmed, the receiver performs an YES/NO check, inputs comments, or the like according to the message type. After that, when the definition button 23 is operated, the comments which are inputted to a comment section are written in the storage region 16e for storing the comment of the message management table 16, and the time and date when the definition button 23 is operated are written in the storage region 16d for storing a completion time and date, as a completion time and date. where the "requirement for comments" or the "requirement for an YES/NO check" is set as an attribute of the message at this time, a process is not handled as completed even if the definition button 23 is operated without inputting comments or performing the YES/NO check. Consequently, the completion time and data are not written in the message management table 16.

According to this embodiment, when a message is displayed, a sender of the message and all receivers thereof can observe the states of the receivers of the message, that is, whether or not each receiver opens the message, whether or not each receiver confirms the message, whether or not a completion state is obtained by completing the matter described in the message, or what kind of comments each receiver makes on the message. Therefore, for example, in the case of a message for confirming the progress of the business of a member of a group, the states of all the members can be determined by looking at the message, the completion state in a receiver state list, comments and the like. Accordingly, the leader of the group can determine the states of all the members without reading the respective messages transmitted from the members. Since a member can determine the states of the other members, members can share information similarly to the case where all the members get together and report their states to each other. Therefore, the present invention can provide a virtual electronic space for performing a series of operations such as instructions and prosecutions of the business, reports on the states thereof, or the like.

Figure 16:
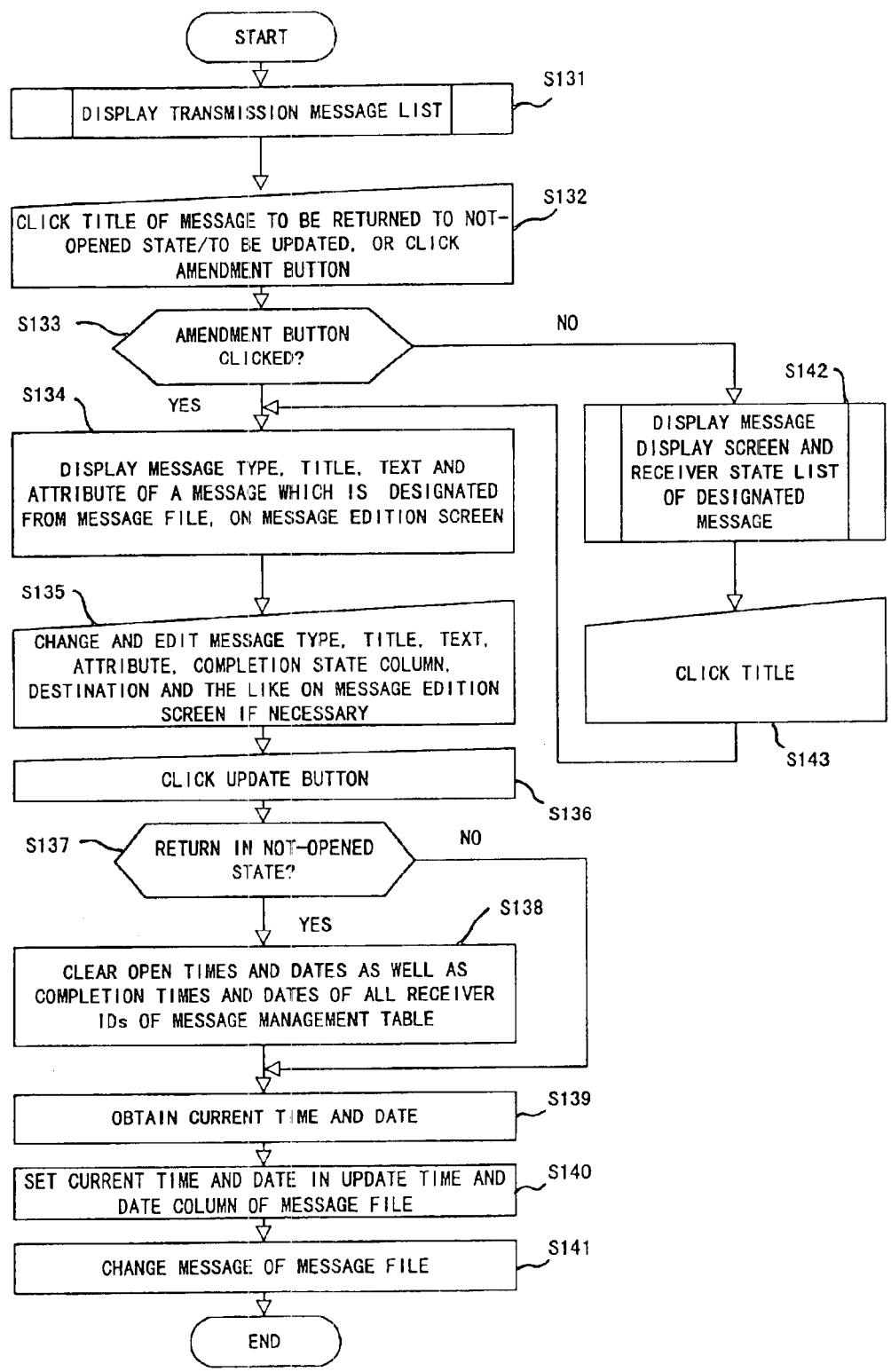
FIG. 16 is a flowchart showing amending a transmitted message and returning the thus-amended message in a not-opened state.

Next, processes of amending a transmitted message and returning the amended message in a not-opened state will be explained with reference to the flowchart shown in FIG. 16.

When operations for displaying the list of messages to be transmitted is performed by a user, the message processing program 14 of the server 13 detects the message of a sender ID which corresponds to the user ID inputted from the terminal 11, from the message file 15. Then, this program displays a transmission message list 31 including a message type, a completion state, a title, transmission time and date, a time limit, an amendment button 32, and a deletion button 33 as shown in FIG. 17 (S131 as shown in FIG. 16). In a state section 31a of the transmission message list 31, the number of receivers who transmit completion responses among the receivers of messages, and the completion ratio are displayed.

The sender looks at this list and clicks the title of a message to be updated or the amendment button 32 (S132).

The message processing program 14 determines whether or not the amendment button 32 is operated (S133). In the case where the amendment button 32 is operated, data of a message which is designated by the message file 15 are read out, and a message edition screen shown in FIG. 18 is displayed (S134). On this message edition screen, the message type, the title, the text, the sender's name, the attributes, the examination and approval, the destination to be deleted, and the destination to be added, which are read out from the message file 15 are displayed.

The sender changes a message type, a title, a text, an attribute, a completion state section, and a destination if necessary (S135). After the sender amends the necessary data, and he or she clicks an update button 34 while he or she keeps a check button for determining whether or not data should be returned in the not-opened state in a completion state section, in a check state (shown as a black box in FIG. 18), or in a not-checked state (S136). When the thus-amended data are transmitted as a new message, a new transmission button 35 is clicked. When the message is deleted, a delete button 36 is clicked.

The message processing program 14 determines whether or not a message is returned in a not-opened state, according to a fact about whether or not a check box for returning in a not-opened state is checked (S137).

where the message is returned in a not-opened state, the open time and date, and the completion time and date of the corresponding message ID of the message management table 16 are cleared (S138). Next, the current time and date are obtained (S139) to be written in a region 15i for storing the update time and date of the message file 15 (S140). Further, the amended data are written in the corresponding storage region of the message file 15 (S141). where the message is returned in a not-opened state, since the comments which the receiver wrote are not modified, response operations terminate after operating the definition button 23 if the receiver displays the amended message, confirms the contents, and does not require to change the comments.

For example, when such an amendment requires the addition or deletion of a destination, and the sender sets a check box for returning a message in a not-opened state, in a not-checked state, the flow advances from step S137 to step S139. At this time, the update time and date are written in the message file 15 without clearing the completion time and date.

In the case where it is determined in step S133 that the amendment button 32 is not clicked, that is, a title is clicked, the flow advances to step S142, and the designated message and receiver states are displayed linked with each other. When the title section of a message is further clicked displaying the message, the screen changes to a screen for editing a message (S143), and the processes in and after S134 are performed.

Thus, where data of the transmitted message are changed, the message can be returned in the not-opened state. Accordingly, when a message is amended, it is not necessary to prepare a new message again to be transmitted, so that the operations for preparing a message can be reduced, where the amended message requires comments, and the comments to the amended message do not need to be changed, the receiver neither prepares a new response message nor inputs comments to the received message, since the comments which were previously prepared are stored without modification. Therefore, the operations for a message response are reduced.

Next, the contents of a process corresponding to the designation of a sender and an approver, which is shown in step S14 shown in FIG. 3, are explained with reference to the flowchart shown in FIG. 19.

Figure 19:
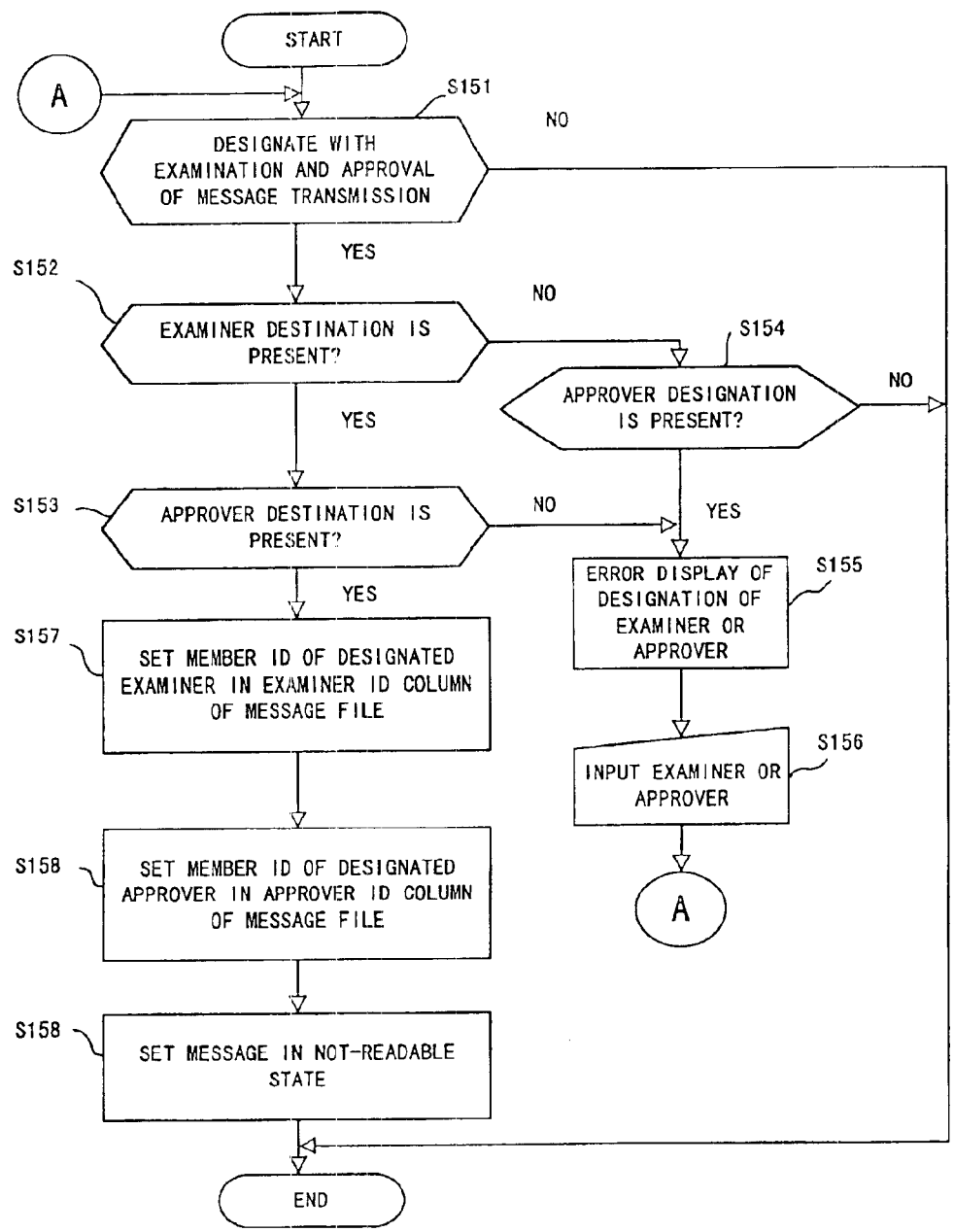
FIG. 19 is a flowchart showing a process corresponding to the designation of an examiner and an approver.

First, it is determined whether or not the designation of the examination and approval is present on a message transmission screen (S151 shown in FIG. 19). If YES, it is determined whether or not the designation of an examiner is performed (S152). In the case where the examiner is designated, it is further determined whether or not the approver is designated (S153).

In the case the examiner is not designated, the flow advances to step S154, and it is determined whether or not the designation of the approver is performed. When the approver is designated, the error display of an examiner designation is performed (S155). When the approver is not designated, the error display of an approver designation is performed in step S155. When the sender designates an examiner or an approver (S156), the flow returns in step S151.

In the case where an examiner and an approver are designated (YES in steps S152 and S153), an ID of the designated examiner is written in a region 15j for storing the examiner ID of the message file 15 (S157).

Next, an ID of the designated approver is written in a region 15L for storing the approver ID of the message file 15 (S158).

Further, in order that the other users cannot read this message until the examination and approval are completed, data such that only the examiner and approver can read this message are written in a region 15n for storing the data indicating whether or not the message file 15 is readable.

Figure 20:
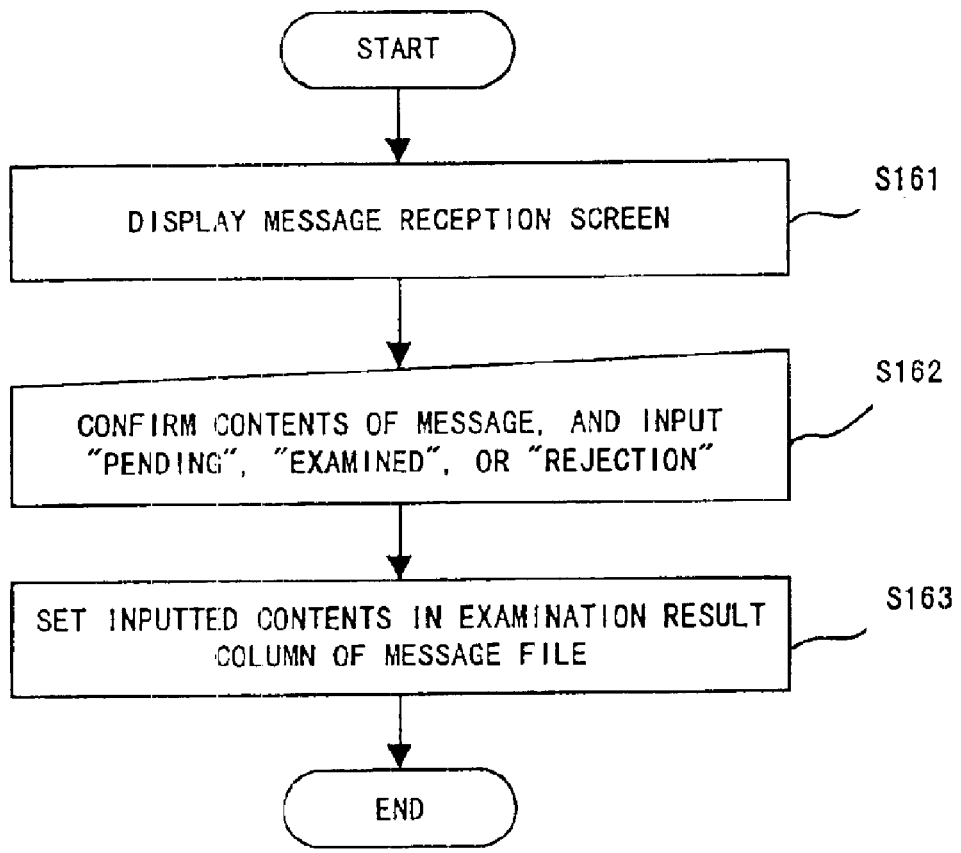
FIG. 20 is a flowchart showing an examination process.

Next, the examination and approval processes will be explained with reference to FIGS. 20 and 21. At the time of log-on, if there is a message to be examined and approved by a user who logs on to a server, a message to be examined and approved is specified in a received message list which has not been checked. Accordingly, the examiner clicks the corresponding title. When the title is clicked, the message processing program 14 detects a received message ID of the message management table 16 according to the user ID of the examiner which is inputted from the terminal 11. Further, this program 14 determines whether or not the designated message obtained by detecting the message file 15 according to the message ID is a message which requires the examination and approval. In the case where the received message requires the examination and approval, it is determined whether or not the examiner ID corresponds to the user ID, which are set in the message file 15. If these IDs correspond to each other, this message is displayed in step S161 shown in FIG. 20.

The examiner confirms the contents of the displayed message, and inputs "pending", "examined", or "deletion" in the examination and approval section of the message (S162). The message processing program 14 writes the examination results which are inputted to the examination and approval section, in a region 15k for storing the examination results of the message file 15 (S163).

Similarly to the above-mentioned examination, when the approver clicks the title of a message which requires the approval of a received message list 20 which has not been checked, the message processing program 14 detects the message file 15 according to the message ID of the designated message, and determines whether or not the designated message requires the examination and approval. If the received message requires the examination and approval, the message processing program 14 determines whether or not the approver ID which is set in the message file 15 corresponds to the user ID which is inputted from the terminal 11. If the IDs correspond to each other, this message is displayed in step S171 shown in FIG. 21.

Further, the message processing program 14 determines whether or not the message is examined, that is, whether or not data are written in a region 15k of the message file 15 for storing the examination results corresponding to the message ID (S172). In the case where no data are written, the process terminates at this point. When data are written in, it is determined whether or not the examination results have been examined (S173).

When a message has been examined, the approver confirms the contents of the message and inputs "pending", "examined", or "rejection" (S174).

Then, the message processing program 14 writes this inputted "pending", "examined", or "rejection" in a region 15m for storing examination results of the message file 15 (S175). Further, this message processing program 14 determines whether or not the approved results are actually "approved" (S176). If the result is "approved", the message processing program 14 writes information indicating that the message is readable, in a region 15n for storing whether or not a message is readable, and makes this message readable (S177).

Next, a process of storing a received message as a to-do list will be explained with reference to FIG. 22.

Figure 22:
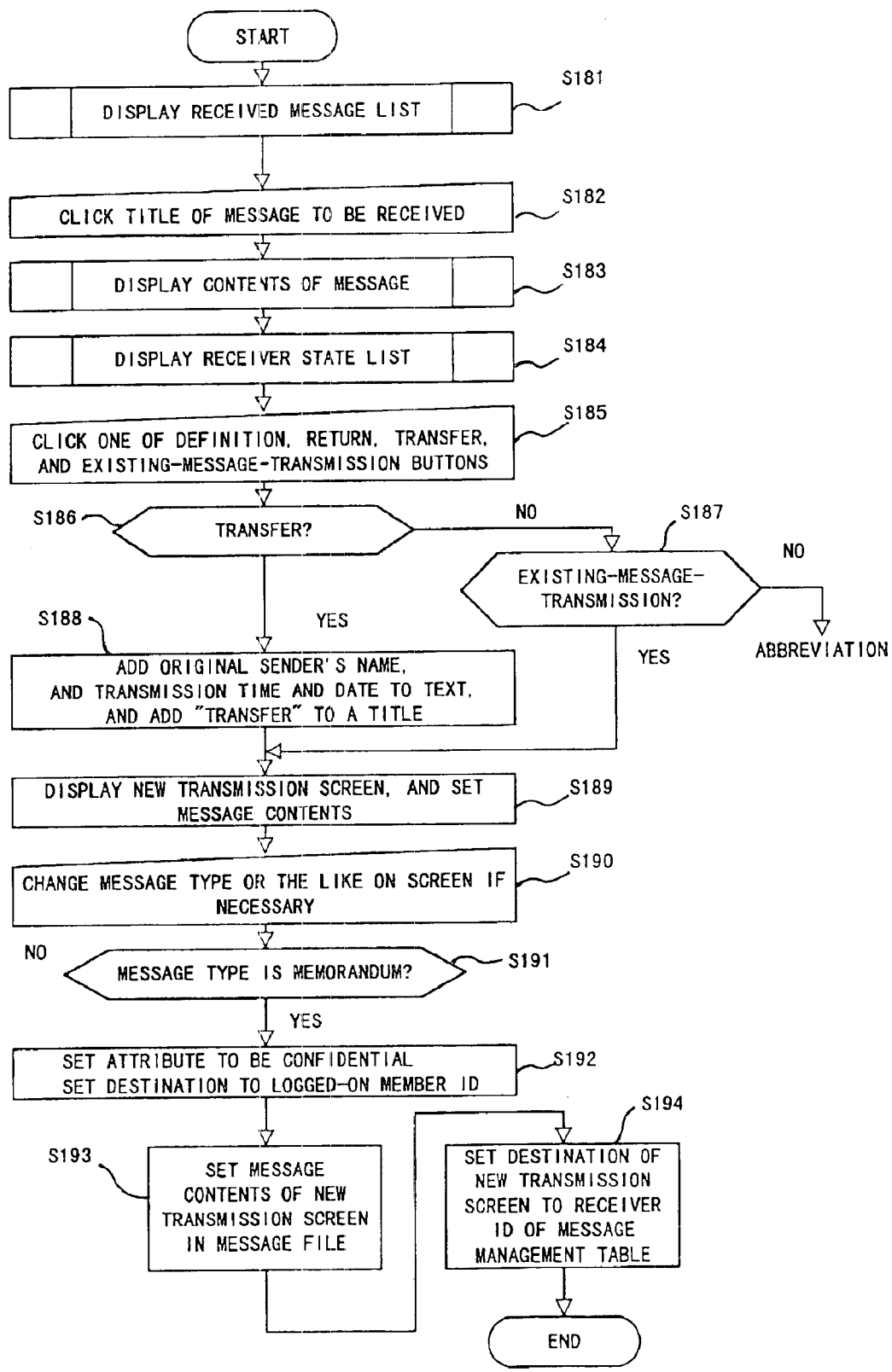
FIG. 22 is a flowchart showing the process of storing received messages as a to-do list.

First, the received message list 20 is displayed (S181 shown in FIG. 22). If the receiver clicks the title of a specific message regarding this list (S182), the contents of this message are displayed (S183). Further, a receiver state list 22 is displayed (S184). After the receiver operates one of a definition button, a return button, a transfer button, and an existing-message-transmission button (S185), it is determined which one of the transfer button 21 (S186), an existing-message-transmission button 25 (S187), or other buttons is the thus-operated button. In the case where the thus-operated button is the transfer button 24, the original sender's name as well as the original transmission time and date are added to the text, and further a transfer operation is added to the title (S188). At the process after step S188 or after the existing-message-transmission button 25 is operated (S187), a new transmission screen is displayed, and the contents of the original received message are set (S189). The above-mentioned process is basically the same as that performed from step S41 to step S49 shown in FIG. 6.

The receiver changes the message type or the like on screen if necessary (S190). For example, the receiver sets a memorandum as the message type of an existing message to be transferred or to be used.

The message processing program 14 determines whether or not the message type is a memorandum. If the message type is a memorandum, its attribute is made to be confidential, and the destination is made to be a user ID (S192).

FIG. 23 is a table showing the display screen of a to-do list. A memorandum is displayed as a message type, a transfer operation is displayed in a title section, and the transmission date and the sender of an original message are displayed in a text section. In this case, the message type is a memorandum and the destination is the user thereof. Therefore, it is displayed in the receiver state list 22 that the user is the only receiver.

If the process returns to those processes shown in FIG. 22, and the execution button 21 is operated, the contents of a new transmission screen are written in each region of the message file 15 (S193). Further, the destination is written in the receiver ID of the message management table 16 (S194).

According to these processes, when the completion schedule of business or the like is reported in a message response, the response message can be stored as a confidential message by making the message type a memorandum. Thus, it can be confirmed whether or not a matter is promised the completion date of business is present, according to a memorandum.

Below is the explanation of the embodiment in which a receiver can automatically set the type of a comment to be answered on a receiver s side, when preparing a message.

In this embodiment, a message type/comment pattern table 32 as shown in FIG. 24 is provided. This table 32 stores a comment pattern and the contents of the comment pattern (comment alternative which will be described later) corresponding to a message type. In the section of the contents of the comment pattern shown in FIG. 24, a comment alternative to which a "reason" is added is an extension requiring the reason why the comment alternative is selected. When the receiver selects "refusal" or "pending" as a comment, it is necessary to input the reason.

In FIG. 24, only one kind of comment pattern is displayed for a single message type. However, a plurality of comment patterns are stored for a single message type, and they are displayed when a message type is designated, so that a sender can select an arbitrary comment pattern among them.

Figure 25:
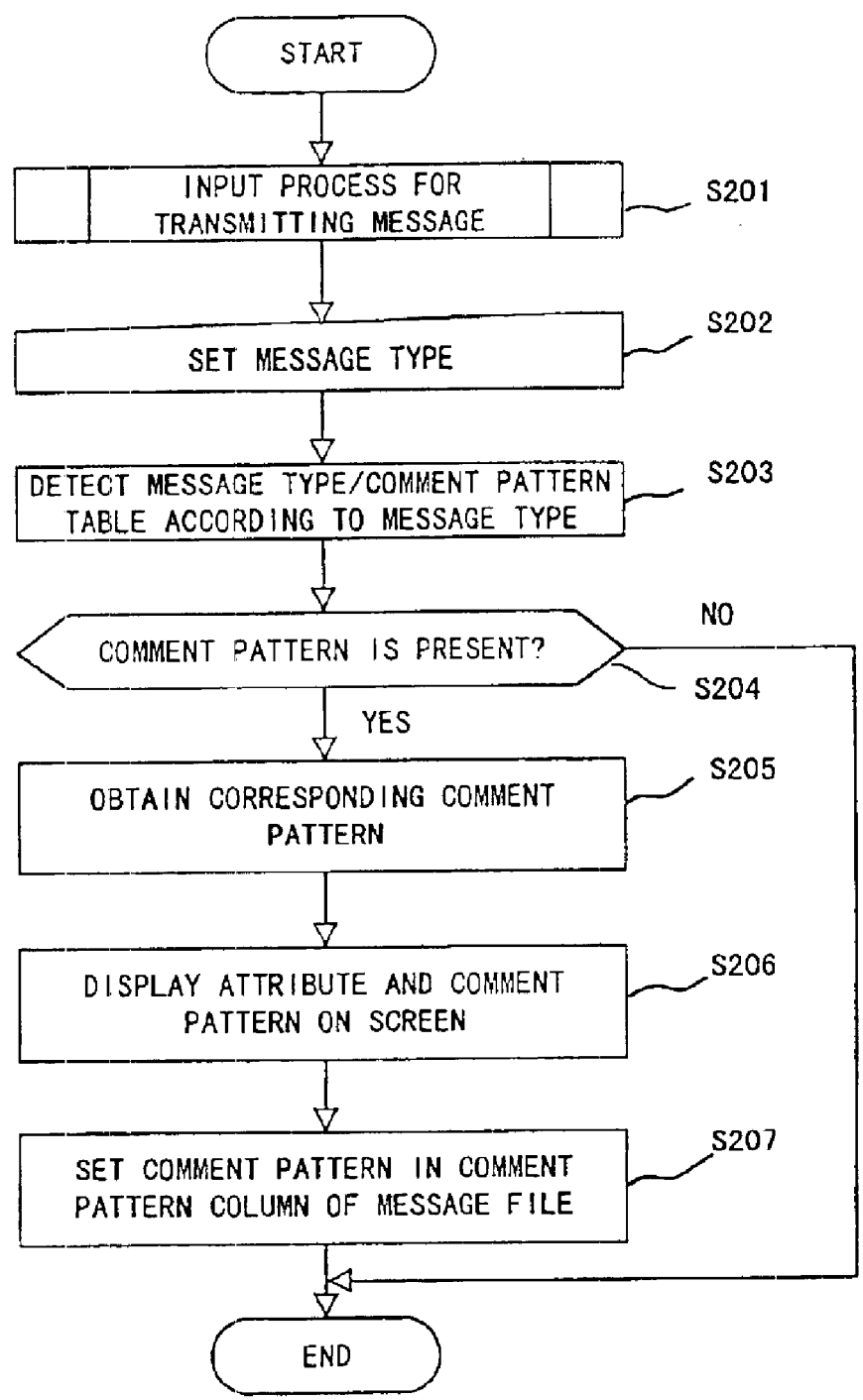
FIG. 25 is a flowchart showing the process of automatically setting the comment pattern corresponding to a message type at the time of transmitting a message.

A text, a destination or the like are first inputted on the preparation screen of a new message (S201 shown in FIG. 25), and a message type is set (S202).

The message processing program 14 detects the message type/comment pattern table 32 according to the thus-inputted message type (S203). It is determined whether or not the corresponding comment pattern is present (S204). When a comment pattern is present, this comment pattern is obtained (S205). Further, its attribute is displayed in an attribute section, and the thus-obtained comment is displayed in a comment section (which is newly prepared on the message transmission screen shown in FIG. 4) (S206). When the sender completes the preparation of a message and operates the execution button 21, the comment pattern displayed in a comment section is written in a region 15p for storing a comment pattern of the corresponding message of the message file 15 (S207).

According to this embodiment, when the sender designates a message type, a comment pattern corresponding to this message type is automatically selected. Then, the comment pattern and the contents of the comment pattern, for example, a comment alterative such as "approval", "rejection", "pending", or the like are displayed in the message comment section on a receiver side. Consequently, the receiver can prepare comments by selecting one of such comment alternatives. Thus, since the receiver prepares comments by selecting a specific comment alternative from a plurality of comments alternatives which are designated by the sender, comments can be obtained from the receiver based on the sender's intention.

Next, a process of automatically setting comments at the time of receiving a message will be explained with reference to FIG. 26.

Figure 26:
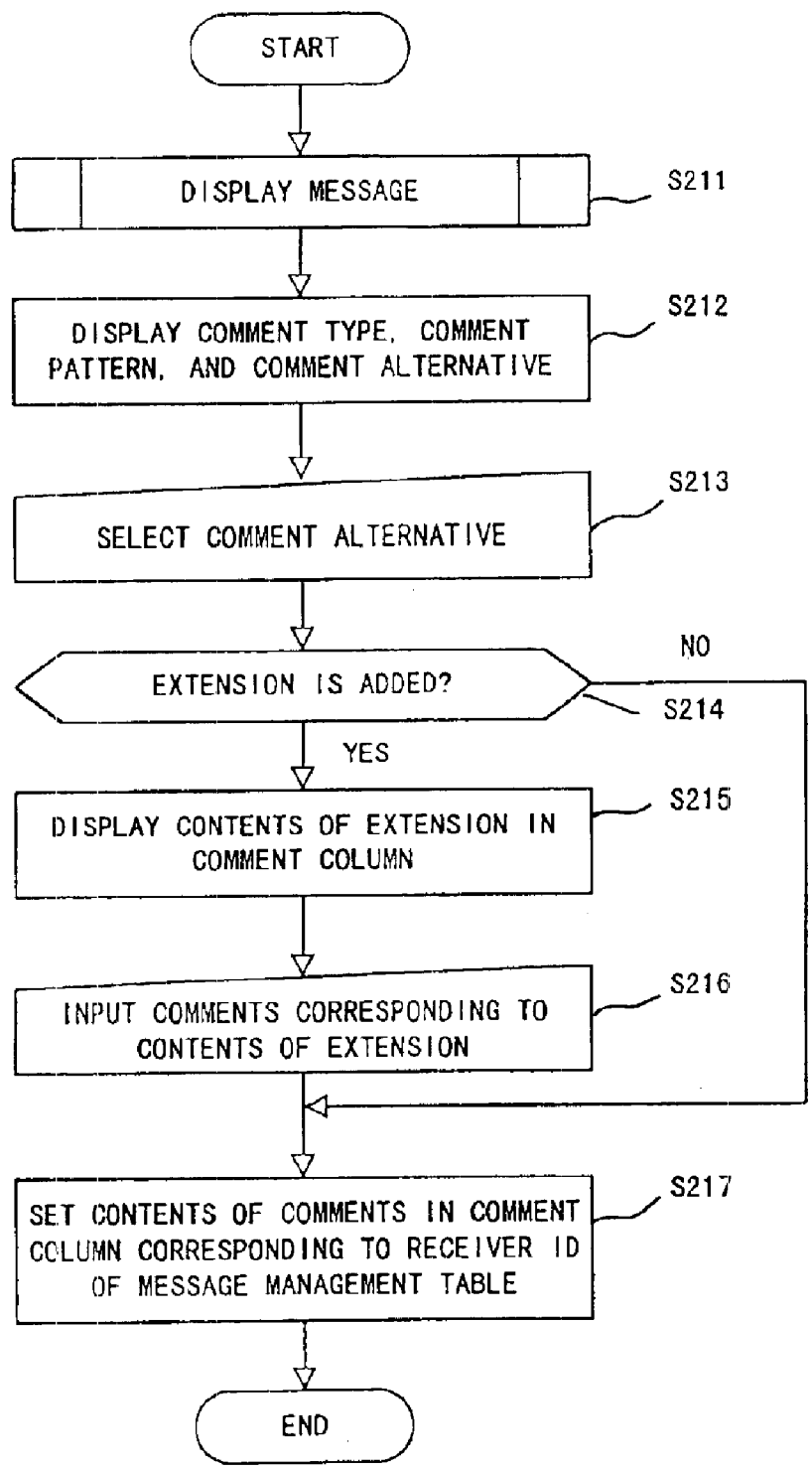
FIG. 26 is a flowchart showing the process of automatically setting the comment pattern corresponding to a message type when receiving a message.

When the receiver clicks the title of the received message list 20 to designates the message to be opened, the message type, the comment pattern, the title, the context, the comment alternative of the designated message, and the like are read out from the message file 15, thereby displaying these on the screen of the terminal 11 (S211 shown in FIG. 26).

When a comment pattern is set in a region 15p for storing the comment pattern of the corresponding message of the message file 15, the contents of a further-set comment pattern, that is, a comment alternative, are read out from the message type/comment pattern table 32, so that the comment pattern and the comment alternative are displayed in the comment section (S212).

When the receiver clicks one of the displayed comment alternatives to selects a response comment (S213), the message processing program 14 determines whether or not an extension (for example, an extension requiring a comment to be added) is added (S214). In the case where an extension is added, the contents of the extension are displayed in the comment section on a message display screen (S215). The receiver inputs comments corresponding to the contents of the displayed extension (S216).

For example, when a comment alternative such as "approval", "rejection (reason)", "pending (reason)", "others ( )", "consultation request ( )", or the like is displayed in the comment section of the input screen of a comment alternative as shown in FIG. 27, if the check box of each comment alternative is clicked, the thus-clicked check box becomes checked, and the corresponding comment is selected as a response comment. If this comment is one which is set by an extension (shown as (reason) in FIG. 27), a word such as "reason" is displayed in the comment section, and the reason why this comment alternative was selected is required.

If the process returns to FIG. 26, the input of comments terminates, and the definition button 23 is operated, the message processing program 14 writes the comments which are inputted to the comment section, in a storage region 16e for the comment corresponding to the receiver ID of the message management table 16.

Thus, in the case where a comment pattern is set by a sender, a comment alternative corresponding to the thus-set comment pattern is displayed. Therefore, a receiver can easily prepare a comment which is suitable for the answer required by the sender, only by selecting the comment among comment alternatives.

Next, an extraction statistic process of extracting keywords from the contents of the receiver's comments and obtaining the occupation ratio of each keyword will be explained with reference to the flowchart shown in FIG. 28.

Figure 28:
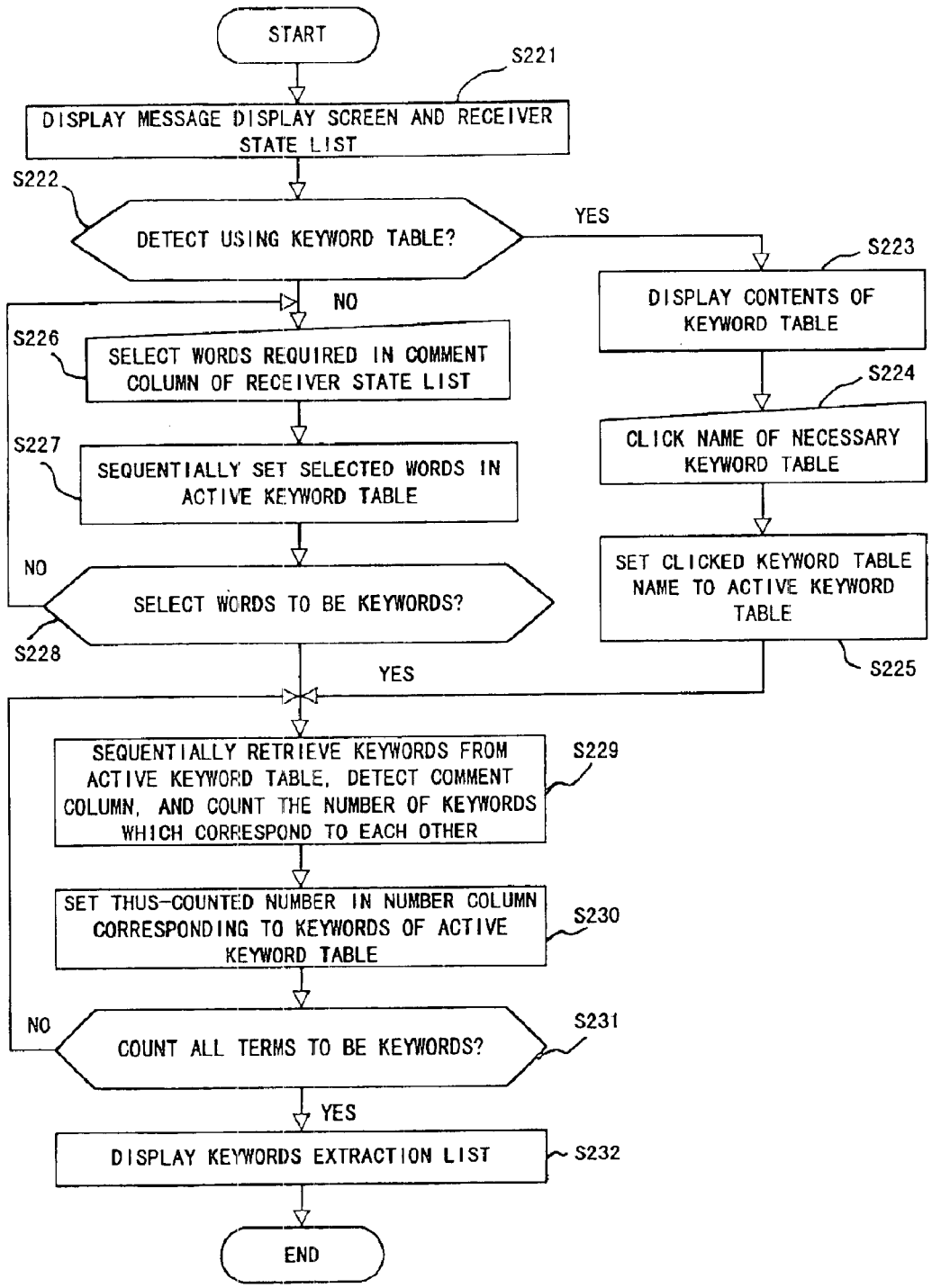
FIG. 28 is a flowchart showing the process of extracting the contents of a comment to be shown as statistics.

First, the designated message and the receiver state list 24 are displayed linked with each other (FIG. 28, S221). Then,
it is determined whether or not a detection operation is performed using a keyword table 33 shown in FIG. 29 (S222). When the detection operation is performed using the keyword table 33, the process advances to step S223, and the contents of the keyword tables 33 are displayed on the terminal 11. The sender selects the name of an optimum keyword from the keyword table 33 taking the contents of the comments into consideration (S224). The keyword corresponding to the thus-selected keyword name of the keyword table 33 is set in an active keyword table 34 shown in FIG. 30 (S225).

If the keyword table 33 is not used (NO in step S222), a user selects the necessary words from the comment section of the receiver state list 24 (S226).

The message processing program 14 sets the words which are selected by the user in the active keyword table 34 (S227). Then, it is determined whether or not the input operation of words to be set as keywords terminates (S228).

Figure 31:
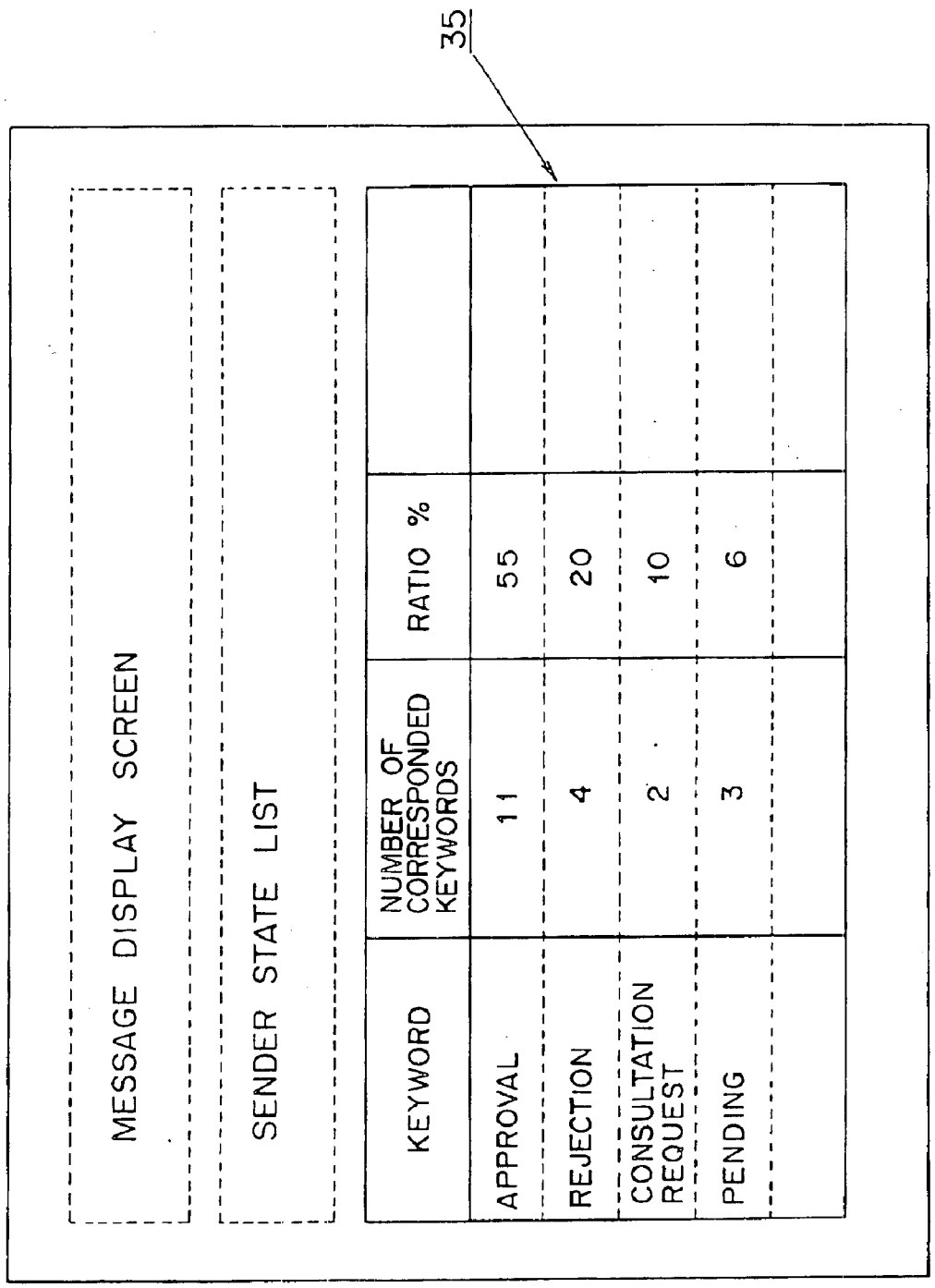
FIG. 31 is a list for extracting keywords.

If the selected keywords of the keyword table 33 are set in the active keyword table 34, or the input operation of the keywords, which is performed by the user, terminates, keywords are sequentially retrieved from the active keyword table 34. Next, the comment section of the receiver state list 24 is detected so that the number of keywords which correspond to each other is counted (S229). Then, the thus-counted number is set as the number corresponding to the keywords of the active keyword table 34 (S230). Next, it is checked whether or not keywords which are not aggregated in the active keyword table 34 are present, and it is determined whether or not all the keywords have been already aggregated (S231). If all the keywords are aggregated in the active keyword table 34, a keyword extraction list 35 shown in FIG. 31 is prepared to be displayed following the receiver state list 24 (S232).

According to the extraction statistic of the contents of a comment, it can be obtained how many users approve or dispute the contents of the messages, how many users reserve their decisions, or the like from the receivers' comments to the messages. Further, each ratio thereof can be obtained.

FIG. 32 is a diagram explaining the case where the above-mentioned message processing program 14 is first stored in a portable storage medium 44 such as a CD-ROM, a floppy disk or the like, or a storage apparatus which a program provider has, and then this program is loaded to a processor 41 to be executed.

In the case where this program is stored in the portable storage medium 44 such as a CD-ROM, a floppy disk or the like, the portable storage medium 44 is inserted to a drive apparatus 42, thereby reading out this program. Then, the thus-read-out program is stored in a memory 43 such as a RAM, a hard disk or the like, thereby executing this program. In the case where a program is provided from a program provider thorough a communication line, the program which is stored in a storage apparatus, a memory of the program provider, or the like is received in the processor 41 through the communication line. Then, the thus-received program is stored in the memory 43 such as a RAM, a hard disk or the like to be executed. A program to be stored in the storage medium can include a part of the function of the above-mentioned message processing program 14. For example, a program for managing the receiver state list 24 and a program for displaying the receiver state list 24 on the terminal 11 are respectively stored in different storage media, so that the respective programs can be executed by a message processing equipment or a terminal.

According to the above-mentioned embodiment, the message file 15, the message management table 16, and the like are stored in the storage apparatus of the server 13. By contrast, a storage apparatus for storing a message can be provided independently from the server 13, and the server 13 can write a message in the storage apparatus or can read out a message from the storage apparatus, through a communication line.

According to the present invention, since a message and a receiver state list indicating the states of a receiver of this message are displayed linked with each other, the sender of a message or all the receivers can determine simultaneously the states of all the receivers of the messages, for example, whether or not each receiver approves the message or whether or not his or her business is completed, together with the contents of the message. Since information indicating whether or not the message has been opened, whether or not the message has been confirmed, and completion information indicating whether or not the receiver's business has been completed, are displayed as a receiver state list, the completion states of all the receivers can be determined simultaneously. Further, since a formatted message like a work flow related to the business and a not-formatted message for an individual receiver are displayed in a list together with the respective message types, messages with different objectives can be referred to on the same display screen together with their message types. Further, since a sender sets keywords, and performs a statistical process by extracting keywords from the receiver's comments, he or she can effectively obtain the receiver's response or reaction to the message as statistically analyzed data.

What is claimed is:

1. A message processing apparatus connected to a plurality of terminal apparatuses via a network, comprising:

a preparation unit preparing a receiver state list containing names of a plurality of receivers, each receiver having received an interpersonal message relating to a business activity, the receiver state list also containing individual states of each of the respective receivers, each individual state being mutually associated with the name of a corresponding receiver, where each individual state of each receiver indicates a status of that receiver's activity regarding the business activity, and where the indicating is based on responses received from the receivers in response to the interpersonal message; and a message management unit enabling display of, in a mutually associated manner, the interpersonal message relating to the business activity and the receiver state list, where the display is enabled on each of the terminal apparatuses belonging to a sender and the plurality of the receivers of the interpersonal message relating to the business activity, wherein the sender comprises a manager managing the business activity, the receivers comprise respective staff, the interpersonal message is a message inquiring about progress of the staff concerning the business activity, and the manager receives the response messages from the staff, where the responses include completion information indicating whether the business activity has been completed, and wherein the preparation unit prepares the receiver state list containing, in the mutually associated manner, the names of the plurality of receivers and the states of each of the respective receivers to indicate, based on completion information in the responses, whether the business activity has been completed, and wherein the preparation unit prepares information representing a ratio of received having completed the business activity based on the completion information, which indicates respective completion states of the business activity of the receivers of the interpersonal message relating to the business activity, and prepares a message list containing, in a mutually associated manner, the information presenting the ratio of the receivers having completed the business activity and also containing a title of the interpersonal message relating to the business activities; and the message management unit enables display of the message list and the receiver state list in the mutually associated manner on each of the terminal apparatuses belonging to the sender and the plurality of receivers of the interpersonal message relating to the business activity.

2. A message processing apparatus connected to a plurality of terminal apparatuses via a network, comprising:

a preparation unit preparing a receiver state list containing names of a plurality of receivers, each receiver having received an interpersonal message relating to a business activity, the receiver state list also containing individual states of each of the respective receivers, each individual state being mutually associated with the name of a corresponding receiver, where each individual state of each receiver indicates a status of that receiver's activity regarding the business activity, and where the indicating is based on responses received from the receivers in response to the interpersonal message;

a message management unit enabling display of, in a mutually associated manner, the interpersonal message relating to the business activity and the receiver state list, where the display is enabled on each of the terminal apparatuses belonging to a sender and the plurality of the receivers of the interpersonal message relating to the business activity;

a detection unit automatically detecting designated keywords from comments submitted by a receiver of the interpersonal message in response to the interpersonal message; and a counter unit counting a number of comments which include the keywords detected by the detection unit, wherein the message management unit causes the number of comments including the designated keywords to be displayed on a terminal.

3. A message management method for use by a server apparatus connected via a network to a plurality of terminal apparatuses, comprising:

preparing a receiver state list containing names of a plurality of receivers each having received an interpersonal message addressed to the receivers, where the interpersonal message relates to a business activity, where each name is mutually associated with a state of its respective receiver, and where each such state is based on a response to the interpersonal message from the state's receiver;

enabling display of the interpersonal message in association with the receiver state list, where the displaying is enabled on each of the terminal apparatuses belonging to a sender of and the terminal apparatuses of the plurality of receivers of the interpersonal message relating to the business activities;

preparing information presenting the ratio of the receivers having completed the assigned business activities based on the completion information indicating the completion states of the business activities respectively assigned to the plurality of receivers of the interpersonal message relating to the business activities, and preparing a message list containing, in a mutually associated manner, the information presenting the ratio of the receivers having completed the assigned business activities and a title of the interpersonal message relating to the business activities; and enabling display of the message list in mutual association with the receiver state list, where the display is enabled on each of the terminal apparatuses belonging to the sender and the plurality of receivers of the interpersonal message relating to the business activities.

4. A computer readable storage medium storage medium storing a program, the program comprising:

preparing a receiver state list containing names of a plurality of receivers, each receiver having received an interpersonal message relating to a business activity, the receiver state list also containing individual states of each of the respective receivers, each individual state being mutually associated with the name of a corresponding receiver, where each individual state of each receiver indicates a status of that receivers activity regarding the business activity, and where the indicating is based on responses received from the receivers in response to the interpersonal message;

enabling display of, in a mutually associated manner, the interpersonal message relating to the business activity and the receiver state list, where the display is enabled on each of the terminal apparatuses belonging to a sender and the plurality of the receivers of the interpersonal message relating to the business activity;

preparing information presenting the ratio of the receivers having completed the assigned business activities based on the completion information indicating the completion states of the business activities respectively assigned to the plurality of receivers of the interpersonal message relating to the business activities, and preparing a message list containing, in a mutually associated manner, the information presenting the ratio of the receivers having completed the assigned business activities and a title of the interpersonal message relating to the business activities; and enabling display of the message list in mutual association with the receiver state list, where the display is enabled on each of the terminal apparatuses belonging to the sender and the plurality of receivers of the interpersonal message relating to the business activities.

* * * * *

UNITED STATES PATENT AND TRADEMARK OFFICE
CERTIFICATE OF CORRECTION

PATENT NO. : 6,898,621 B2
DATED : May 24, 2005
INVENTOR(S) : Minoru Kuriki et al.

It is certified that error appears in the above-identified patent and that said Letters Patent is hereby corrected as shown below:

<u>Column 18,</u>
Line 2, change "received" to -- receivers --.

<u>Column 19,</u>
Line 15, delete "storage medium" (2nd occurrence).
Line 24, change "receivers" to -- receiver's --.

Signed and Sealed this

Second Day of May, 2006

JON W. DUDAS
*Director of the United States Patent and Trademark Office*